(12) United States Patent
Markwart et al.

(10) Patent No.: US 9,227,730 B2
(45) Date of Patent: Jan. 5, 2016

(54) SYSTEM AND METHOD FOR AIR CONDITIONING AT LEAST ONE PARTIAL REGION OF AN AIRPLANE

(75) Inventors: Michael Markwart, Halstenbek (DE); Peggy Bendfeldt, Hamburg (DE); Ingo Gores, Hamburg (DE); Uwe Buchholz, Bliedersdorf (DE); Christina Koepp, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1186 days.

(21) Appl. No.: 12/738,482

(22) PCT Filed: Oct. 17, 2008

(86) PCT No.: PCT/EP2008/008817
§ 371 (c)(1),
(2), (4) Date: May 19, 2010

(87) PCT Pub. No.: WO2009/053002
PCT Pub. Date: Apr. 30, 2009

(65) Prior Publication Data
US 2010/0240290 A1 Sep. 23, 2010

Related U.S. Application Data

(60) Provisional application No. 60/980,887, filed on Oct. 18, 2007.

(30) Foreign Application Priority Data

Oct. 18, 2007 (DE) .......................... 10 2007 049 926

(51) Int. Cl.
*B64D 13/08* (2006.01)
*B64D 13/00* (2006.01)
*B64D 13/06* (2006.01)

(52) U.S. Cl.
CPC ........ *B64D 13/00* (2013.01); *B64D 2013/0625* (2013.01); *B64D 2013/0662* (2013.01); *B64D 2013/0688* (2013.01); *Y02T 50/44* (2013.01); *Y02T 50/56* (2013.01)

(58) Field of Classification Search
CPC .................. B64D 13/06; B64D 13/08; B64D 2013/0625; B64D 2013/0688; B64D 13/006; B64D 13/00; B64D 2013/0662; Y02T 50/44; Y02T 50/56
USPC .................................... 454/76, 71, 72, 73, 74
See application file for complete search history.

(56) References Cited

U.S. PATENT DOCUMENTS

| 2,220,108 A | 11/1940 | Huffman et al. |
| 2,427,698 A | 9/1947 | Arnhym |

(Continued)

FOREIGN PATENT DOCUMENTS

| DE | 740169 | 8/1943 |
| DE | 2936462 | 3/1981 |

(Continued)

OTHER PUBLICATIONS

Zhang, T. and Chen. Q. 2005. "Comparison of different ventilation systems for commercial aircraft cabin," Proceedings of Indoor Air 2005, vol. IV, pp. 3205-3210, Beijing, China.*

(Continued)

*Primary Examiner* — Gregory Huson
*Assistant Examiner* — Dana Tighe
(74) *Attorney, Agent, or Firm* — Wood, Herron & Evans, LLP

(57) ABSTRACT

A system for air conditioning at least one partial region of an aircraft comprises an air providing device for providing air to be supplied to a region of the aircraft to be ventilated at a desired temperature and pressure. A supply air duct is connected at a first end to the air providing device. A second end of the supply air duct is connected to an air inlet which opens near the floor into the aircraft region to be ventilated. A control device is set up to ensure that the air provided by the air providing device enters the aircraft region to be ventilated via the air inlet at such a speed that the air is distributed near the floor in the aircraft region to be ventilated and rises at heat sources present in the aircraft region to be ventilated, and that the air provided by the air providing device enters the aircraft region to be ventilated via the air inlet at such a temperature that a desired ambient temperature is set in the aircraft region to be ventilated.

28 Claims, 9 Drawing Sheets

(56) References Cited

U.S. PATENT DOCUMENTS

| | | | | |
|---|---|---|---|---|
| 2,449,231 | A * | 9/1948 | Jerger | 454/73 |
| 2,755,638 | A * | 7/1956 | Sevin | 62/402 |
| 3,483,711 | A * | 12/1969 | Malczewski | 62/91 |
| 3,583,175 | A * | 6/1971 | Eubank | 62/326 |
| 3,599,429 | A * | 8/1971 | Bigelis et al. | 60/39.092 |
| 4,742,760 | A * | 5/1988 | Horstman et al. | 454/76 |
| 4,819,720 | A | 4/1989 | Howard | |
| 4,955,285 | A | 9/1990 | Geilinger et al. | |
| 4,969,509 | A | 11/1990 | Merensky | |
| 5,253,484 | A * | 10/1993 | Corman et al. | 62/239 |
| 5,261,855 | A * | 11/1993 | Law et al. | 454/76 |
| 5,545,084 | A * | 8/1996 | Fischer et al. | 454/76 |
| 5,695,396 | A * | 12/1997 | Markwart et al. | 454/76 |
| 5,701,755 | A | 12/1997 | Severson et al. | |
| 5,702,073 | A | 12/1997 | Fluegel | |
| 5,791,982 | A * | 8/1998 | Curry et al. | 454/74 |
| 6,116,541 | A * | 9/2000 | Chuang et al. | 244/129.4 |
| 6,169,850 | B1 * | 1/2001 | Menassa | 392/350 |
| 6,409,590 | B1 * | 6/2002 | Suzuki et al. | 454/143 |
| 6,551,184 | B1 * | 4/2003 | Mayer et al. | 454/76 |
| 6,719,623 | B1 * | 4/2004 | Kodaveridan et al. | 454/76 |
| 7,442,121 | B2 * | 10/2008 | Cassidy et al. | 454/306 |
| 2004/0031279 | A1 | 2/2004 | Kamiya et al. | |
| 2004/0171342 | A1 * | 9/2004 | Kodaveridan et al. | 454/76 |
| 2005/0087613 | A1 * | 4/2005 | Trecate | 236/49.1 |
| 2006/0192050 | A1 * | 8/2006 | Cheung et al. | 244/118.6 |
| 2006/0211362 | A1 * | 9/2006 | Levy et al. | 454/186 |
| 2008/0271465 | A1 * | 11/2008 | Mossberg et al. | 62/5 |
| 2009/0163131 | A1 * | 6/2009 | Walkinshaw et al. | 454/76 |
| 2009/0275277 | A1 * | 11/2009 | Al-Alusi et al. | 454/76 |
| 2009/0298408 | A1 * | 12/2009 | Reisbach | 454/76 |
| 2010/0029190 | A1 * | 2/2010 | Dessero et al. | 454/76 |
| 2010/0279595 | A1 * | 11/2010 | Horstman et al. | 454/76 |
| 2011/0237173 | A1 * | 9/2011 | Kelnhofer et al. | 454/76 |
| 2013/0005231 | A1 * | 1/2013 | Schneider et al. | 454/76 |

FOREIGN PATENT DOCUMENTS

| | | |
|---|---|---|
| DE | 3812739 | 7/1989 |
| DE | 4227965 | 2/1994 |
| DE | 0584733 | 3/1994 |
| DE | 19855594 | 8/2000 |
| DE | 10361645 | 8/2005 |
| DE | 102005040571 | 3/2007 |
| EP | 0177657 | 4/1986 |
| EP | 0693423 | 1/1996 |
| FR | 882307 | 5/1943 |
| FR | 1073651 | 9/1954 |
| JP | 50106311 | 8/1975 |
| JP | 57163470 | 10/1982 |
| JP | H06191404 | 7/1994 |
| JP | H10109644 | 4/1998 |
| JP | 2001 010595 | 1/2001 |
| JP | 2001183026 | 7/2001 |
| JP | 2004132677 | 4/2004 |
| WO | 2008140972 | 11/2008 |

OTHER PUBLICATIONS

International Search Report, PCT/ISA/210, PCT/ISA/237.
Dr.-Ing. Franc Sodec, Quelllüftung und ihre Anwendungsbereiche Vorteile und Einsatzgrenzen von Raumluftströmung, Fachjournal Mar. 2002, Lüftung FF. English Abstract.
European Patent Office, European Search Report for European Patent Application No. 11003796.7, Oct. 26, 2011 (5 pgs).
Japanese Patent Office, Non-Final Office Action, Mar. 12, 2013, Japanese (2 pgs.), English translation (4 pgs.).

* cited by examiner

Fig. 1    (Prior art)

SYSTEM AND METHOD FOR AIR CONDITIONING AT LEAST ONE PARTIAL REGION OF AN AIRPLANE

This application claims priority to PCT/EP2008/008817 filed Oct. 17, 2008, which claims priority to German Application No. 10 2007 049 926.6 and U.S. Application No. 60/980,887, both filed Oct. 18, 2007.

TECHNICAL FIELD

The present invention relates to a system and a method for air conditioning at least one partial region of an aircraft.

BACKGROUND

At present, air conditioning systems used in aircraft for ventilating and pressurising the aircraft passenger cabin and/or the cargo compartment work on the principle of mixing ventilation. In the case of mixing ventilation, which is also called dilution ventilation or jet ventilation, air, which is optionally temperature-controlled as required, is blown into the part of the aircraft to be ventilated, with a high impulse and at a high speed (approximately 0.7 to 3 m/s), through air inlets usually arranged in the ceiling region of a part of the aircraft to be ventilated. Owing to the high impulse and the high speed of the air blown in, tumble air movements form in the part of the aircraft to be ventilated which ensure a virtually homogeneous intermixing of the air with the ambient air, free convection induced by heat sources and cold or hot surfaces being dominated by the forced flow of the tumble air movements. The air jets of the tumble air movements may reach air speeds which are beyond the comfort limit for the passengers and crew. The exhaust air is usually removed from the part of the aircraft to be ventilated through air outlets provided in the floor region of the part of the aircraft to be ventilated. Exhaust air removed through the air outlets is generally at least partly filtered, mixed with fresh outside air in a mixer and finally returned to the part of the aircraft to be ventilated. For setting a desired cabin pressure, as required, excess exhaust air can be removed to the environment through pressure regulating valves (outflow valves) which connect a pressurised region of the aircraft to the outside atmosphere.

The formation of tumble air movements necessarily results in regions in which free convection and forced flow complement one another or are added to one another and regions in which the free convection opposes the forced flow. The resulting ambient flow thus has regions at a high flow speed and regions at a low flow speed. The differences in flow speed increase with increasing heat load. Moreover, the relatively concentrated introduction of the cool air, the jet formation and the inhomogeneous speed and cooling-load introduction in the part of the aircraft to be ventilated may result in an uneven temperature distribution. Furthermore, the supply of very cool air into the passenger cabin leads to marked reductions in the comfort of the passengers and crew members. Consequently, the difference between the temperature of the air supplied via the air inlets and the temperature of the ambient air in the part of the aircraft to be ventilated must not be too great. High heat loads can then, however, only be removed by means of correspondingly high air volume flows which require an air supply at very high speed and/or an enlargement of the air outlets. This may lead to unpleasant draughts and disturbing noises.

The short distance between the air inlets and the seat positions of the passengers in passenger aircraft limits the available jet length and the speed of the air blown in through the air inlets. In certain circumstances, however, air speeds which are at least locally above the comfortable range may result, while at the same time other regions of the cabin are not sufficiently ventilated. Moreover, special regions provided in the aircraft passenger cabin, such as, for example, galleys, rest zones for crew members or bar areas and also curtains used for zoning the aircraft passenger cabin, may disturb the formation of the tumble air movements characteristic of mixing ventilation, which may likewise result in reductions in the comfort of the passengers and the crew members, at least in locally defined regions of the cabin. Furthermore, the partly turbulent air flow conditions arising in mixing ventilation increase the drying-out of the skin, eyes and mucous membranes caused by the low atmospheric humidity in the passenger cabin of only 5 to 15% relative humidity.

A further disadvantage of the mixing ventilation principle is that, due to the tumble air movements which form, harmful substances are rapidly distributed in the entire flow cross-section of the aircraft and, moreover, longitudinal flows are promoted. This is problematical, particularly in the event of a fire with smoke formation, since the smoke is distributed so quickly due to the air flow conditions which arise in mixing ventilation that no uncontaminated escape areas remain.

Finally, an aircraft cabin which is ventilated by an air conditioning system working on the principle of mixing ventilation can be subdivided into individual climatic zones only in the longitudinal direction. This leads to severe restriction of the flexibility in the design of the aircraft cabin which is increasingly demanded by the market.

In the past, the heat load to be removed from an aircraft cabin has continually increased due to the installation of entertainment electronics systems for the passengers, lighting systems and the like. If this trend were to continue, it could become increasingly difficult in future to find a reasonable compromise between comfortable air temperature and speed and proper heat removal in the operation of an aircraft air conditioning system working on the principle of mixing ventilation.

The present invention is directed at the object of specifying a system and a method for air conditioning at least one partial region of an aircraft which enable proper removal even of high heat loads from a part of the aircraft to be ventilated and at the same time the creation of comfortable ambient conditions for the passengers and crew members situated in the part of the aircraft to be ventilated.

SUMMARY

To achieve this object, a system, according to the invention, for air conditioning at least one partial region of an aircraft comprises an air providing device for providing and conditioning air to be supplied to a region of the aircraft to be ventilated at a desired temperature, pressure and humidity and in a desired quantity. The aircraft region to be ventilated can be a passenger cabin or a section of the passenger cabin, but also another region of the aircraft, such as, for example, a cargo compartment or a section of the cargo compartment. The air providing device can comprise a compressor device. The compressor device can be designed, for example, in the form of an air cycle machine which is supplied with bleed air provided by the engines of the aircraft or with air provided by compressors of the aircraft or any other air source. Preferably, the air providing device or the compressor device of the air providing device is also suitable for dewatering the air to be supplied to the region of the aircraft to be ventilated. Furthermore, the air providing device preferably comprises a mixer, in which the air-conditioned air provided by the compressor device is mixed with recirculation air in order to control the temperature and/or the humidity of the air provided by the air providing device. Fine control of the temperature of the air to be supplied to individual climatic zones of the aircraft can be effected by supplying additional hot air downstream of the mixer. The hot air can be branched off from the engines of the aircraft as bleed air, but also provided by any other hot-air source. Alternatively or additionally to this, it is of course also possible to heat the air-conditioned air provided by the compressor device of the air providing device to the desired temperature, if required, by means of a suitable heating device, such as, for example, an electrical heating device.

A supply air duct of the system, according to the invention, for air conditioning at least one partial region of an aircraft is connected at a first end to the air providing device. A second end of the supply air duct is connected to an air inlet which opens near the floor into the region of the aircraft to be ventilated. The supply air duct thus forms a connection between the air providing device and the air inlet. The system according to the invention can have merely one, for example large-area, air inlet. Alternatively to this, however, a plurality of air inlets which open near the floor into the region of the aircraft to be ventilated can be provided. For example, a plurality of large-area air inlets can be provided. If required, the supply air duct can also be appropriately branched in order to supply all the air inlets with air provided by the air providing device.

Finally, the aircraft air conditioning system according to the invention comprises a control device which is set up to ensure that the air provided by the air providing device enters the region of the aircraft to be ventilated via the air inlet at such a speed that the air is distributed near the floor in the region of the aircraft to be ventilated and rises at heat sources present in the region of the aircraft to be ventilated. In other words, the control device ensures that a pressure is set in the supply air duct which ensures that the air leaves the air inlet with an impulse and at a speed which are markedly lower than in a system working on the principle of mixing ventilation. The control device can comprise an electrical or electronic control unit for controlling the air providing device which ensures that the air is led from the air providing device into the supply air duct at a desired pressure. Such a control unit can also be used to control, as desired, the quantity and the humidity of the air provided by the air providing device. Alternatively or additionally to this, however, the control device can also have mechanical components, such as, for example, valves, throttles, screens, etc., for setting the air pressure in the supply air duct. These mechanical components can be electronically or electrically controlled, it being possible to use for this the electrical or electronic control unit which is also used for controlling the air providing device.

In an aircraft region ventilated by means of the aircraft air conditioning system according to the invention, completely different flow conditions arise than in an aircraft region ventilated according to the mixing ventilation principle. In particular, no tumble air movements form. The speed and the impulse of the air exiting the air inlet influence the ambient flow in the aircraft region to be ventilated only in the immediate vicinity of the air inlet. Instead, the flow conditions in the aircraft region to be ventilated are determined by thermal effects, in particular the lifting forces of the heat sources present in the aircraft region to be ventilated. The flow conditions arising in an aircraft region ventilated by means of the air conditioning system according to the invention are thus similar to the flow conditions which form in a building ventilated according to the principle of displacement ventilation.

The flow speed at which the air provided by the air providing device exits the air inlet is, as already mentioned, influenced by the air pressure in the supply air duct, but also by a flow cross-section of the air inlet or the air inlets. If the air inlet has a constant flow cross-section, the control device controls the air pressure in the supply air duct, taking account of the constant flow cross-section of the air inlet. That is to say, the air pressure in the supply air duct is controlled in such a way that, when the air passes through the flow cross-section of the air inlet, the flow speed and the flow impulse which lead to the desired, previously defined flow conditions in the region of the aircraft to be ventilated are set. Alternatively to this, however, the air inlet can also have a variable flow cross-section. The control device can then be set up to control both the air pressure in the supply air duct and the flow cross-section of the air inlet in such a way that the air exits the air inlet at the speed and with the impulse such that the desired, previously defined flow conditions are set in the region of the aircraft to be ventilated. Alternatively to this, however, a separate control device, for example an electronic control unit, for controlling the variable flow cross-section of the air inlet can also be present.

An air providing device used in an aircraft can only provide a limited air volume flow in energy-efficient operation. The ambient temperature in the region of the aircraft to be ventilated can therefore be controlled only to a limited extent, in the air conditioning system according to the invention, by appropriate control of the air volume flow supplied to the aircraft region to be ventilated. The control device of the system, according to the invention, for air conditioning at least one partial region of an aircraft is therefore further set up to ensure, by appropriate control of the air providing device, that the air provided by the air providing device enters the region of the aircraft to be ventilated via the air inlet at such a temperature that a desired ambient temperature is set in the region of the aircraft to be ventilated. The temperature of the air provided by the air providing device can be controlled, for example, by appropriate setting of the temperature of the air produced by a compressor device of the air providing device, by admixing recirculation air with the air produced by the compressor device in a mixer of the air providing device and/or by admixing hot air downstream of the mixer. The ambient temperature in the region of the aircraft to be ventilated can be controlled with the aid of signals which are transmitted to the control device by a temperature sensor arranged in the region of the aircraft to be ventilated.

In the air conditioning system according to the invention, the air-conditioning air is supplied to the aircraft region to be ventilated at a markedly lower speed and with a markedly lower impulse than is the case in an air conditioning system working on the mixing ventilation principle. Noise annoyance caused by the supply of air at high speed in an air conditioning system working on the mixing ventilation principle is thus reliably avoided in the arrangement according to the invention. In an aircraft region ventilated with the aid of the air conditioning system according to the invention, moreover, no tumble air movements characteristic of mixing ventilation form. Rather, the air-conditioning air is distributed slowly over the entire floor area of the aircraft region to be ventilated and rises slowly at heat sources through free convection. The ambient flow arising in the aircraft region to be ventilated is thus distinguished by low air speeds over a large area. As a result, draughts which reduce the comfort of the passengers and crew members are avoided. Furthermore, the drying-out of the skin, eyes and mucous membranes is reduced, so that dry air is perceived as much less unpleasant.

Finally, the lower air exchange at surfaces arranged in the aircraft region to be ventilated leads to less soiling of the cabin covering.

A further advantage of the flow conditions arising in an aircraft region ventilated with the aid of the air conditioning system according to the invention is that harmful substances and pathogens are no longer distributed evenly in the transverse direction. This enables a marked improvement of the air quality in the aircraft region to be ventilated. The flow conditions arising in an aircraft region ventilated with the aid of the air conditioning system according to the invention are particularly advantageous in the event of a fire with smoke formation, since the smoke is not distributed so quickly in the aircraft region to be ventilated. Furthermore, the air supply through the air inlet arranged near the floor results in an air layer, near the floor, which contains mainly fresh air and is thus less contaminated by smoke. Passengers and crew members can then, for example, run with a stoop or crawl on the floor along the emergency lighting, while breathing in less contaminated air.

Since, finally, the flow conditions in an aircraft region ventilated by means of the air conditioning system according to the invention are no longer determined by a forced tumble air movement flow, the basis for a flexible zoning of the aircraft region to be ventilated is created, although the outlay involved in creating individual climatic zones (sensors, heaters, hot-air supply and air ducting) remains the same. For example, an aircraft cabin ventilated by means of the air conditioning system according to the invention can also be subdivided into individual climatic zones in the transverse direction. This enables appreciable flexibilisation of the cabin design.

The aircraft air conditioning system according to the invention enables proper removal even of high heat loads from the aircraft region to be ventilated. Furthermore, it can react particularly well to individually varying heat loads. In particular, the control device can be set up to ensure individual ventilation and temperature control of individual aircraft regions. In other words, the flow speed and/or the temperature of the air entering an aircraft region to be ventilated via the air inlet can be varied from one aircraft region to another, in order to react to different heat loads or different utilisation in the individual aircraft regions.

In a preferred embodiment of the system, according to the invention, for air conditioning at least one partial region of an aircraft, the control device is set up to ensure that the air provided by the air providing device enters the region of the aircraft to be ventilated via the air inlet at a speed of 0.1 to 0.5 m/s. The air entry speed is preferably chosen in such a way that, on the one hand, no tumble air movements form and, on the other hand, the passengers do not feel any draughts, which is the case when the air speed in the vicinity of the passengers remains below the comfort limit of approximately 0.25 m/s. The preferred air entry speed thus also depends on the distance of the air inlet from the passengers. If the air is introduced near the passengers, the air entry speed is preferably approximately 0.25 m/s. In a situation in which the air inlet is at a greater distance from the passengers or the supply air is introduced in a virtually laminar flow in a displacement system, an even higher air entry speed could also be chosen, but it must be reduced in the vicinity of the passengers to such an extent that the comfort limits are observed.

The air inlet or air inlets can be arranged in the region of a floor of the aircraft region to be ventilated. In particular when a plurality of air inlets are provided, the air inlets can be distributed over the entire floor of the aircraft region to be ventilated. Alternatively to this, it is also possible to concentrate the air outlets in a certain section/certain sections of the floor. When the aircraft region to be ventilated is the passenger cabin of the aircraft, the air inlets can be arranged, for example, in a section of the passenger cabin floor forming the aisle region or under the passenger seats.

The air inlet or air inlets can also be arranged in a region, near the floor, of a side wall of the aircraft region to be ventilated. In particular when a plurality of air inlets are present, the air inlets can be distributed over the entire region, near the floor, of a side wall of the aircraft region to be ventilated. Alternatively to this, however, it is also conceivable to concentrate the air inlets in a certain section/certain sections of the region, near the floor, of a side wall of the aircraft region to be ventilated. Furthermore, it is also conceivable to provide one air inlet or a plurality of air inlets in the region of a floor of the aircraft region to be ventilated and additionally one air inlet or a plurality of air inlets in a region, near the floor, of a side wall of the aircraft region to be ventilated.

A preferred embodiment of the aircraft air conditioning system according to the invention further comprises a device for providing and conditioning auxiliary air to be supplied to the region of the aircraft to be ventilated at a desired temperature, pressure and humidity and in a desired quantity. The auxiliary air providing device can be a separate device which has a similar construction to the air providing device. Alternatively to this, however, the auxiliary air providing device can also be formed by the air providing device, integrated in the air providing device or connected to the air providing device. What is essential is merely that auxiliary air is led to the auxiliary air inlet separately from the air supplied to the air inlet, with the pressure, temperature, humidity and/or quantity of the auxiliary air preferably being settable independently of the pressure, temperature, humidity and/or quantity of the air supplied to the air inlet.

The auxiliary air providing device is preferably connected to a first end of an auxiliary air duct. A second end of the auxiliary air duct can be connected to an auxiliary air inlet opening into the aircraft region to be ventilated. It is possible for merely one auxiliary air inlet, for example of large-area or gap-shaped design, to be provided. Alternatively to this, however, a plurality of auxiliary air inlets can also be present. The auxiliary air duct can then be appropriately branched in order to supply all the auxiliary air inlets with auxiliary air provided by the auxiliary air providing device.

The auxiliary air inlet or auxiliary air inlets can be arranged in the region of a side wall of the aircraft region to be ventilated. Alternatively or additionally to this, the auxiliary air inlet or auxiliary air inlets can also be arranged in the region of a ceiling of the aircraft region to be ventilated. For auxiliary air inlets arranged in the region of a side wall or in the region of a ceiling of the aircraft region to be ventilated, separate auxiliary air providing devices and/or auxiliary supply air ducts can be provided in each case. It is, however, also possible to connect merely one auxiliary air providing device via corresponding auxiliary supply air ducts to auxiliary air inlets arranged in the region of a side wall and in the region of a ceiling of the aircraft region to be ventilated.

The aircraft air conditioning system according to the invention preferably further comprises an auxiliary control device which is set up to ensure that the auxiliary air provided by the auxiliary air providing device enters the aircraft region to be ventilated, via an auxiliary air inlet arranged in the region of a side wall of the aircraft region to be ventilated, at such a speed that the air is distributed in the aircraft region to be ventilated in the region of a plane defined by the arrangement of the auxiliary air inlet, i.e. horizontally approximately at the height of the auxiliary air inlet, and rises at heat sources present in the aircraft region to be ventilated. The auxiliary control device can comprise an electrical or electronic control unit for controlling the auxiliary air providing device. This control unit can control the auxiliary air providing device in such a way that the air is led from the auxiliary air providing device into the auxiliary supply air duct at a desired pressure. Such a control unit can also be used to control, as desired, the quantity and the humidity of the air provided by the auxiliary air providing device. Alternatively or additionally to this, however, the auxiliary control device can also have mechanical components, such as, for example, valves, throttles, screens, etc., for setting the air pressure in the auxiliary supply air duct. These mechanical components can be electronically or electrically controlled, it being possible to use for this the electrical or electronic control unit which is also used for controlling the auxiliary air providing device.

The auxiliary control device is preferably set up to ensure that the auxiliary air provided by the auxiliary air providing device enters the region of the aircraft to be ventilated, via the auxiliary air inlet arranged in the region of a side wall of the aircraft region to be ventilated, at a speed of at most 1 m/s. With such an air blowing-in speed and an impulse, resulting therefrom, of the blown-in auxiliary air, it is ensured that the previously described flow conditions arise in the aircraft region to be ventilated.

When the auxiliary air is blown into the aircraft region to be ventilated, via the auxiliary air inlet arranged in the region of a side wall of the aircraft region to be ventilated, at such a speed and with an impulse, resulting therefrom, that the previously described flow conditions arise in the aircraft region to be ventilated, i.e. no tumble air movements characteristic of mixing ventilation are formed, the previously described advantages which are obtained on using the aircraft air conditioning system according to the invention are completely preserved. At the same time, the supply of auxiliary air at a slightly higher speed than the speed at which the air blown in via the air inlet is supplied and/or a slightly lower temperature than the temperature of the air blowing in via the air inlet enables flexible adaptation of the power of the air conditioning system according to the invention to certain demand situations, for example when the aircraft is running on the ground. As a result, proper heat removal from the aircraft region to be ventilated is ensured at all times, i.e. even at high heat loads.

Furthermore, the auxiliary control device can be set up to ensure that the auxiliary air provided by the auxiliary air providing device is blown into the aircraft region to be ventilated, via the auxiliary air inlet arranged in the region of a side wall of the aircraft region to be ventilated, at such a temperature that a desired ambient temperature is set in the aircraft region to be ventilated.

The auxiliary control device can be designed as a separate device. However, the auxiliary control unit is preferably formed at least partly by components of the control device for controlling the speed and the temperature of the air entering the aircraft region to be ventilated via the air inlet, or is integrated in this control device.

The auxiliary control device can also be set up to ensure that the auxiliary air provided by the auxiliary air providing device enters the aircraft region to be ventilated, via the auxiliary air inlet arranged in the region of a side wall of the aircraft region to be ventilated, at such a speed that tumble air movements characteristic of mixing ventilation form in the aircraft region to be ventilated and free convection in the aircraft region to be ventilated is substantially suppressed. Such a control of the auxiliary air speed may be expedient in certain situations, for example while the aircraft is on the ground, when particularly high heat loads have to be removed from the aircraft region to be ventilated. The speeds of the air entering the aircraft region to be ventilated via the air inlet and of the auxiliary air entering the aircraft region to be ventilated via the auxiliary air inlet can also be controlled in such a way that tumble air movements characteristic of mixing ventilation form in an upper section of the aircraft region to be ventilated, whereas the flow conditions in a lower section of the aircraft region to be ventilated are determined by free convection.

Finally, the auxiliary control device can be set up to ensure, as required, that the auxiliary air provided by the auxiliary air providing device enters the aircraft region to be ventilated, via the auxiliary air inlet arranged in the region of a side wall of the aircraft region to be ventilated, at such a speed that the air is distributed in the aircraft region to be ventilated in the region of a plane defined by the arrangement of the auxiliary air inlet, i.e. horizontally approximately at the height of the auxiliary air inlet, and rises at heat sources present in the aircraft region to be ventilated, or that the auxiliary air provided by the auxiliary air providing device enters the aircraft region to be ventilated, via the auxiliary air inlet, at such a speed that tumble air movements characteristic of mixing ventilation form in the aircraft region to be ventilated. This enables particularly flexible adaptation of the air conditioning power of the air conditioning system according to the invention to certain demand situations. The supply of auxiliary air via the auxiliary air inlet can also be employed particularly advantageously for heating or cooling processes when there are no passengers on board, e.g. on the first startup of an aircraft on a cold or hot day.

The aircraft air conditioning system according to the invention further preferably comprises an auxiliary control device which is set up to ensure that the auxiliary air provided by the auxiliary air providing device enters the aircraft region to be ventilated, via an auxiliary air inlet arranged in the region of a ceiling of the aircraft region to be ventilated, at a lower speed than the air entering the aircraft region to be ventilated via the air inlet. The auxiliary control device is preferably set up to control the speed of the air exiting the auxiliary air inlet arranged in the region of a ceiling of the aircraft region to be ventilated in such a way that the air "trickles" out of the auxiliary air inlet and is thereby also effective substantially only in the region of the ceiling and the aisle of the aircraft region to be ventilated.

For example, the auxiliary control device can be set up to ensure that the auxiliary air provided by the auxiliary air providing device enters the aircraft region to be ventilated, via the auxiliary air inlet arranged in the region of a ceiling of the aircraft region to be ventilated, at a speed of <1 m/s. The auxiliary control device can comprise an electrical or electronic control unit for controlling the auxiliary air providing device. This control unit can control the auxiliary air providing device in such a way that the air is led from the auxiliary air providing device into the auxiliary supply air duct at a desired pressure. Such a control unit can also be used to control, as desired, the quantity and the humidity of the air provided by the auxiliary air providing device. Alternatively or additionally to this, however, the auxiliary control device can also have mechanical components, such as, for example, valves, throttles, screens, etc., for setting the air pressure in the auxiliary supply air duct. These mechanical components can be electronically or electrically controlled, it being possible to use for this the electrical or electronic control unit which is also used for controlling the auxiliary air providing device.

The auxiliary control device for controlling the speed of air to be supplied into the aircraft region to be ventilated via an auxiliary air inlet arranged in the region of a ceiling of the aircraft region to be ventilated can be designed as a separate device. However, the auxiliary control unit is preferably formed at least partly by components of the control device for controlling the speed and the temperature of the air entering the aircraft region to be ventilated via the air inlet and/or of the auxiliary control device for controlling the speed of air to be supplied into the aircraft region to be ventilated via an auxiliary air inlet arranged in the region of a side wall of the aircraft region to be ventilated, or is integrated in this control device.

The auxiliary control device for controlling the speed of the air to be supplied into the aircraft region to be ventilated via an auxiliary air inlet arranged in the region of a ceiling of the aircraft region to be ventilated can also be set up to ensure that the auxiliary air provided by the auxiliary air providing device is supplied, via the auxiliary air inlet arranged in the region of a ceiling of the aircraft region to be ventilated, at a temperature which is lower than the temperature of the air in the aircraft region to be ventilated.

In the aircraft air conditioning system according to the invention, it is possible, owing to the flow conditions arising in the aircraft region to be ventilated, to arrange, in the region of a ceiling of the aircraft region to be ventilated, an air outlet for removing exhaust air from the aircraft region to be ventilated. The air outlet can be formed, for example, by a gap which is formed in a ceiling covering of the aircraft region to be ventilated. As required, however, it is also possible to provide a plurality of air outlets in the region of a ceiling of the aircraft region to be ventilated or to design a ceiling region of the aircraft region to be ventilated to be air-permeable. Alternatively or additionally to this, the air outlet/air outlets can also be formed in lamps fitted in the ceiling region of the aircraft region to be ventilated. In order to ensure proper exhaust air removal via the ceiling region of the aircraft region to be ventilated, the floor region and the side regions of the aircraft region to be ventilated are preferably designed to be sufficiently airtight.

The air outlet is preferably connected via a connecting duct to a pressure regulating valve for setting a desired pressure in the aircraft region to be ventilated. The connecting duct preferably extends along an aircraft skin and follows, for example, the course of a frame. If required, a plurality of pressure regulating valves can also be connected via corresponding connecting ducts to the air outlet or the air outlets for removing exhaust air from the aircraft region to be ventilated.

Since the air outlet in the aircraft air conditioning system according to the invention is arranged in the region of a ceiling of the aircraft region to be ventilated, the pressure regulating valve can be arranged in a side region of an aircraft fuselage upper shell or a side region of the aircraft fuselage lower shell. Furthermore, it is also possible to position the pressure regulating valve in a pressure bulkhead or to integrate the pressure regulating valve in an existing exhaust air duct. In such a case, the flow cross-section of the pressure regulating valve merely has to be designed in such a way as to ensure that the pressure regulating valve functions properly even with a smaller pressure difference acting on the valve. By designing the aircraft air conditioning system according to the invention with an air outlet arranged in the region of a ceiling of the aircraft region to be ventilated, a markedly higher flexibility in the choice of the position for the pressure regulating valve or the pressure regulating valves is thus achieved.

If it is no longer necessary, as hitherto customary, to arrange the pressure regulating valve or the pressure regulating valves for setting a desired pressure in an aircraft region to be ventilated and pressurised or in all the aircraft regions to be ventilated and pressurised in the region of the bottom of the aircraft fuselage lower shell, the bottom region of the aircraft fuselage lower shell no longer has to be used as a stowage space for pipes connected to the pressure regulating valve or the pressure regulating valves either, but may be put to alternative use. For example, this region can be utilised as an additional cargo compartment which, for weight optimisation, can have laterally side boundary walls consisting of a fireproof sheet, instead of conventional prepreg side boundary walls. Furthermore, the formation of a completely or partly unventilated underfloor region is made possible.

Furthermore, an insulation of the aircraft fuselage lower shell can optionally also be dispensed with, since it is no longer necessary to protect pipes running in the bottom region of the fuselage lower shell from temperatures which are too low. Dispensing with an insulation of the aircraft fuselage lower shell is, however, only sensible when cooling of this region is of no importance. This is the case, for example, when the ambient temperature in a cargo compartment arranged in the region of the aircraft fuselage lower shell may/should have a low level and no rest areas for crew members are provided in the region of the aircraft fuselage lower shell either. In order to counteract excessive cooling of a non-insulated aircraft fuselage lower shell, heated air may optionally also be led out of the passenger cabin into the aircraft fuselage lower shell or a cargo compartment arranged in the region of the aircraft fuselage lower shell. Dispensing with an insulation of the aircraft fuselage lower shell enables an advantageous weight reduction. Moreover, the space usable, for example, as a cargo compartment, in the region of the aircraft fuselage lower shell is increased.

If the aircraft fuselage lower shell is not insulated, a connection between an underfloor region arranged in the non-insulated aircraft fuselage lower shell and the passenger cabin is preferably dispensed with. Consequently, however, pressure equalisation between the underfloor region and the cabin is no longer possible either. In order, in the event of a sudden pressure drop in the underfloor region, for example in a cargo compartment arranged in the underfloor region, or in the cabin, to enable a quick pressure equalisation and to prevent damage of the fuselage structure, a movable pressure equalising device is preferably present, which in case of need ensures a pressure equalisation between the underfloor region and the cabin. The pressure equalising device can be formed, for example, by a movable flap or a pressure relief valve which, to ensure a pressure equalisation, opens a connection between the underfloor region and the cabin if a predetermined difference between the pressure in the underfloor region and the pressure in the cabin is exceeded.

Since, as already explained, there is no connection between a cargo compartment, arranged in a non-insulated aircraft fuselage lower shell in the underfloor region, and the aircraft passenger cabin, gases or odours arising in the cargo compartment are also prevented from passing into the passenger cabin in such an arrangement. Particularly good venting of the cargo compartment is ensured when the cargo compartment is connected to the outside atmosphere via a venting device designed, for example, in the form of a venturi device or a flap.

The above aspects have been outlined here in connection with the aircraft air conditioning system according to the invention. However, they may also be realised independently of the aircraft air conditioning system according to the invention and also independently of one another. For example, an air outlet, arranged in the region of a ceiling of an aircraft region to be ventilated, for removing exhaust air from the aircraft region to be ventilated can also be connected via a connecting duct to a pressure regulating valve, arranged in a side region of an aircraft fuselage upper shell or a side region of an aircraft fuselage lower shell, for setting a desired pressure in the aircraft region to be ventilated, when the air outlet is not a constituent of an aircraft air conditioning system according to the invention, but for example is a component of an aircraft air conditioning system working on the principle of mixing ventilation. Similarly, it is also possible, independently of the presence of an aircraft air conditioning system according to the invention, to dispense with the insulation of an aircraft fuselage lower shell, to provide a movable pressure equalising device between an underfloor region and a passenger cabin and/or to equip a cargo compartment with a venting device for connecting the cargo compartment to the outside atmosphere.

The aircraft air conditioning system according to the invention preferably further comprises an exhaust air duct which is connected to the air outlet and leads exhaust air, removed from the aircraft region to be ventilated through the air outlet, in the direction of an air sink. The exhaust air duct preferably extends at least in sections along the ceiling region of the aircraft region to be ventilated. A suction device, such as, for example, a fan or a compressor, can be arranged in the exhaust air duct, in order to suck the exhaust air actively out of the aircraft region to be ventilated. Alternatively to this, however, the exhaust air duct can also be passively operated. In this case, the exhaust air escapes into the exhaust air duct owing to a differential pressure between the aircraft region to be ventilated and the exhaust air duct, in order to be supplied to the air sink via the exhaust air duct.

When the aircraft region to be ventilated is formed by the passenger cabin or a section of the passenger cabin, the exhaust air duct can be bounded, for example, by an upper shell of the aircraft fuselage, panel elements forming a ceiling covering of the passenger cabin, and lateral separating elements, or luggage compartments arranged in the passenger cabin. Alternatively to this, however, the exhaust air duct can also be formed by a pipe which preferably extends along a ceiling region of the aircraft region to be ventilated. A further possibility is to remove the exhaust air through luggage compartments which are ventilatively connected to one another and in this case to design lighting devices as inlets.

Condensation water may form in the exhaust air duct on cold surfaces over which the exhaust air flows. In order to prevent this condensation water from dripping or penetrating into the aircraft region to be ventilated or another region of the aircraft, a condensation water protection device is preferably arranged in the exhaust air duct. The condensation water protection device collects condensation water forming in the exhaust air duct and ensures that it is either led away or evaporates in the ambient air. For example, the condensation water protection device can be formed by a needle felt arranged in the exhaust air duct.

The exhaust air duct is preferably configured and arranged in such a way that exhaust air flowing through the exhaust air duct is brought into thermal contact with heat-generating components, in order to remove heat from the heat-generating components. The heat-generating components can, for example, be systems installed in the ceiling region of the aircraft region to be ventilated, such as, for example, lighting elements or electronic elements. Such a design of the exhaust air duct enables optimal utilisation of the cooling energy stored in the exhaust air, which has an advantageous effect with high heat loads in particular.

The aircraft air conditioning system according to the invention preferably further comprises a recirculation duct, connected to the air outlet and/or to a recirculation outlet formed separately from the air outlet, which serves for returning to the air providing device and/or the auxiliary air providing device exhaust air from the aircraft region to be ventilated. For example, the recirculation duct can branch off from the exhaust air duct. Alternatively to this, the exhaust air duct can, however, also serve merely for exhaust air removal and the recirculation duct can be connected to a recirculation outlet formed separately from the air outlet or to recirculation outlets formed separately from the air outlet. The recirculation outlet or the recirculation outlets can be arranged, for example, in the region of a side wall of the aircraft region to be ventilated. Recirculation air which is removed from the aircraft region to be ventilated via a recirculation outlet arranged in the region of a side wall of the aircraft region to be ventilated is usually cooler than air removed via the ceiling region of the aircraft region to be ventilated. The use of cooler air as recirculation air affords energy advantages which have an advantageous effect in the design of the air conditioning units in particular. Exhaust air returned via the recirculation duct can be led, for example, into a mixer of the air providing device and/or of the auxiliary air providing device.

In a method, according to the invention, for air conditioning at least one partial region of an aircraft, air, to be supplied to a region of an aircraft to be ventilated at a desired temperature, pressure and moisture and in a desired quantity, is provided by means of an air providing device which can be designed as set out above. The air provided by the air providing device is led from the air providing device through a supply air duct to an air inlet which opens near the floor into the aircraft region to be ventilated. A control device ensures that the air provided by the air providing device enters the aircraft region to be ventilated via the air inlet at such a speed that the air is distributed near the floor in the aircraft region to be ventilated and rises at heat sources present in the aircraft region to be ventilated. Furthermore, the control device ensures that the air provided by the air providing device enters the aircraft region to be ventilated via the air inlet at such a temperature that a desired ambient temperature is set in the aircraft region to be ventilated.

The control device preferably ensures that the air provided by the air providing device enters the aircraft region to be ventilated via the air inlet at a speed of 0.1 to 0.5 m/s.

In a preferred embodiment of the method according to the invention, the air is blown into the aircraft region to be ventilated through an air inlet which is arranged in the region of a floor of the aircraft region to be ventilated. Additionally or alternatively to this, however, the air can be blown into the aircraft region to be ventilated through an air inlet which is arranged in a region, near the floor, of a side wall of the aircraft region to be ventilated. The air can be blown into the aircraft region to be ventilated through merely one air inlet. Alternatively to this, however, it is also possible for the air to blown into the aircraft region to be ventilated through a plurality of air inlets.

In a preferred development of the method according to the invention, auxiliary air, to be supplied to the region of the aircraft to be ventilated at a desired temperature, pressure and moisture and in a desired quantity, is additionally provided by means of an auxiliary air providing device. The auxiliary air can be led from the auxiliary air providing device through an auxiliary supply air duct to an auxiliary air inlet which opens into the aircraft region to be ventilated.

The auxiliary air can be blown into the aircraft region to be ventilated via an auxiliary air inlet arranged in the region of a side wall and/or in the region of a ceiling of the aircraft region to be ventilated.

An auxiliary control device preferably ensures that the auxiliary air provided by the auxiliary air providing device enters the aircraft region to be ventilated, via an auxiliary air inlet arranged in the region of a side wall of the aircraft region to be ventilated, at such a speed that the air is distributed in the aircraft region to be ventilated in the region of a plane defined by the arrangement of the auxiliary air inlet and rises at heat sources present in the aircraft region to be ventilated. For example, the auxiliary control unit ensures that the auxiliary air provided by the auxiliary air providing device enters the aircraft region to be ventilated, via the auxiliary air inlet arranged in the region of a side wall of the aircraft region to be ventilated, at a speed of at most 1 m/s.

Furthermore, the auxiliary control device preferably ensures that the auxiliary air provided by the auxiliary air providing device enters the aircraft region to be ventilated, via the auxiliary air inlet arranged in the region of a side wall of the aircraft region to be ventilated, at such a temperature that a desired ambient temperature is set in the aircraft region to be ventilated.

The auxiliary control device can also ensure that the auxiliary air provided by the auxiliary air providing device enters the aircraft region to be ventilated, via the auxiliary air inlet arranged in the region of a side wall of the aircraft region to be ventilated, at such a speed that tumble air movements characteristic of mixing ventilation form in the aircraft region to be ventilated and free convection in the aircraft region to be ventilated is substantially suppressed. Finally, the auxiliary control device can also ensure, as required, that the auxiliary air provided by the auxiliary air providing device enters the aircraft region to be ventilated, via the auxiliary air inlet arranged in the region of a side wall of the aircraft region to be ventilated, at such a speed that the air is distributed in the aircraft region to be ventilated in the region of a plane defined by the arrangement of the auxiliary air inlet, i.e. horizontally approximately at the height of the auxiliary air inlet, and rises at heat sources present in the aircraft region to be ventilated, or that the auxiliary air provided by the auxiliary air providing device enters the aircraft region to be ventilated, via the auxiliary air inlet at such a speed that tumble air movements characteristic of mixing ventilation form in the aircraft region to be ventilated.

Preferably, auxiliary air is provided by the auxiliary air providing device and auxiliary air is supplied into the aircraft region to be ventilated only in selected situations, for example when particularly effective ventilation of the aircraft region to be ventilated is required.

Preferably, an auxiliary control device further ensures that the auxiliary air provided by the auxiliary air providing device enters the aircraft region to be ventilated, via an auxiliary air inlet arranged in the region of a ceiling of the aircraft region to be ventilated, at a lower speed than the air entering the aircraft region to be ventilated via the air inlet. The auxiliary control device preferably controls the speed of the air exiting the auxiliary air inlet arranged in the region of a ceiling of the aircraft region to be ventilated in such a way that the air "trickles" out of the auxiliary air inlet and is thereby also effective substantially only in the region of the ceiling and the aisle of the aircraft region to be ventilated.

For example, the auxiliary control device can ensure that the auxiliary air provided by the auxiliary air providing device enters the aircraft region to be ventilated, via the auxiliary air inlet arranged in the region of a ceiling of the aircraft region to be ventilated, at a speed of <1 m/s.

The auxiliary control device for controlling the speed of the air to be supplied into the aircraft region to be ventilated via an auxiliary air inlet arranged in the region of a ceiling of the aircraft region to be ventilated preferably further ensures that the auxiliary air provided by the auxiliary air providing device is supplied, via the auxiliary air inlet arranged in the region of a ceiling of the aircraft region to be ventilated, at a temperature which is lower than the temperature of the air in the aircraft region to be ventilated.

Preferably, exhaust air from the aircraft region to be ventilated is removed from the aircraft region to be ventilated through an air outlet arranged in the region of a ceiling of the aircraft region to be ventilated and connected via a connecting duct to a pressure regulating valve. For setting a desired pressure in the aircraft region to be ventilated, the exhaust air can be discharged to the outside atmosphere via the pressure regulating valve.

Preferably, the exhaust air from the aircraft region to be ventilated, if required, for setting a desired pressure in the aircraft region to be ventilated, is removed to the outside atmosphere via a pressure regulating valve arranged in a side region of an aircraft fuselage upper shell or in a side region of an aircraft fuselage lower shell.

The exhaust air from the aircraft region to be ventilated can be led through an exhaust air duct, which is connected to the air outlet and extends at least in sections along the ceiling region of the aircraft region to be ventilated, in the direction of an air sink.

Condensation water in the exhaust air duct is preferably caught by means of a condensation water protection device.

Exhaust air flowing through the exhaust air duct can be brought into thermal contact with heat-generating components installed in the ceiling region of the aircraft region to be ventilated, in order to remove heat from the heat-generating components.

Exhaust air removed from the aircraft region to be ventilated through the air outlet and/or a recirculation outlet formed separately from the air outlet can be returned to the air providing device and/or the auxiliary air providing device via a recirculation duct connected to the air outlet and/or to the recirculation outlet.

BRIEF DESCRIPTION OF THE DRAWINGS

Preferred embodiments of the present invention will now be explained in more detail with the aid of the appended schematic drawings, of which

DETAILED DESCRIPTION

Figure 1:
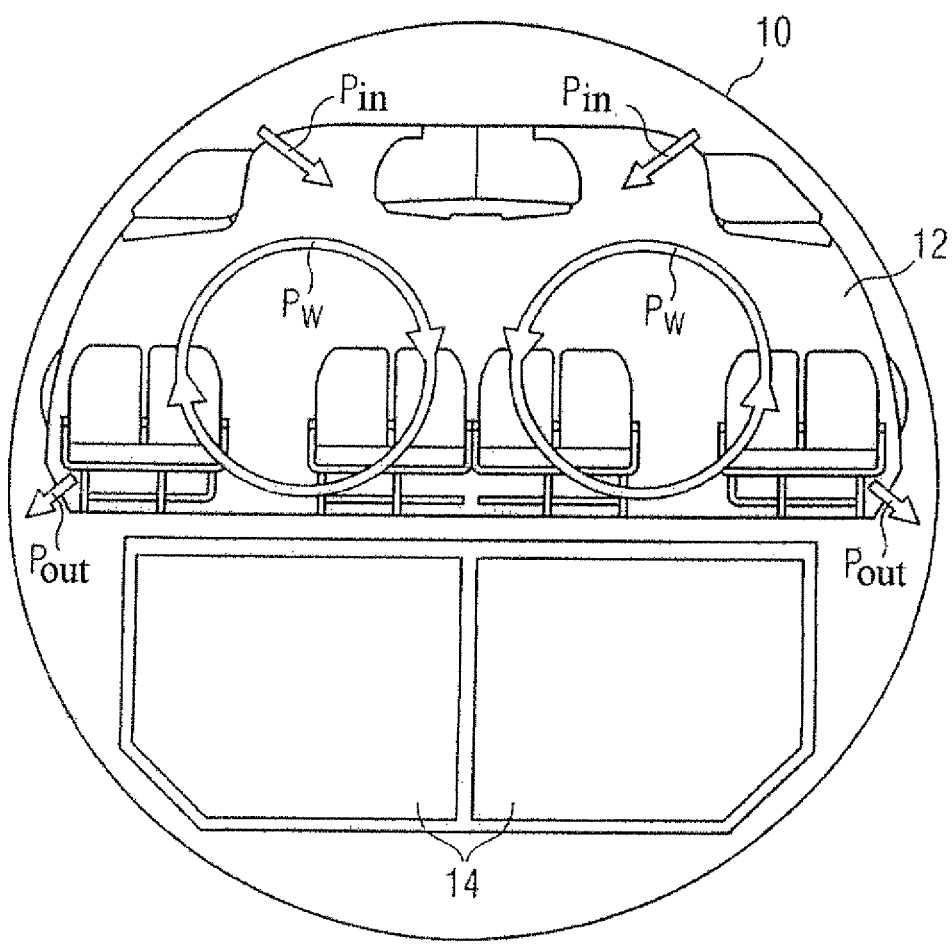
FIG. 1 shows a cross-section through an aircraft fuselage, illustrating the flow conditions which arise when a passenger cabin is ventilated by means of an air conditioning system known from the prior art and working on the principle of mixing ventilation.

FIG. 1 shows a cross-section of an aircraft fuselage 10, in which a passenger cabin 12 and a cargo compartment 14 are arranged. The passenger cabin 12 is ventilated and pressurised by means of an aircraft air conditioning system known from the prior art and working on the principle of mixing ventilation. In this system, air is blown, through air inlets arranged in the ceiling region of the passenger cabin 12, at a high speed of approximately 0.7 to 3 m/s and with a high impulse, into the passenger cabin 12 (see arrows $P_{in}$). Owing to the high impulse and the high speed of the air blown in, tumble air movements (arrows $P_w$) form in the passenger cabin 12, which ensure a virtually homogeneous intermixing of the supplied air with the ambient air, free convection induced by heat sources and cold or hot surfaces being dominated by the forced tumble air movement flow. The exhaust air is removed from the passenger cabin 12 through air outlets provided in the floor region of the passenger cabin (arrows $P_{out}$).

Figure 2:
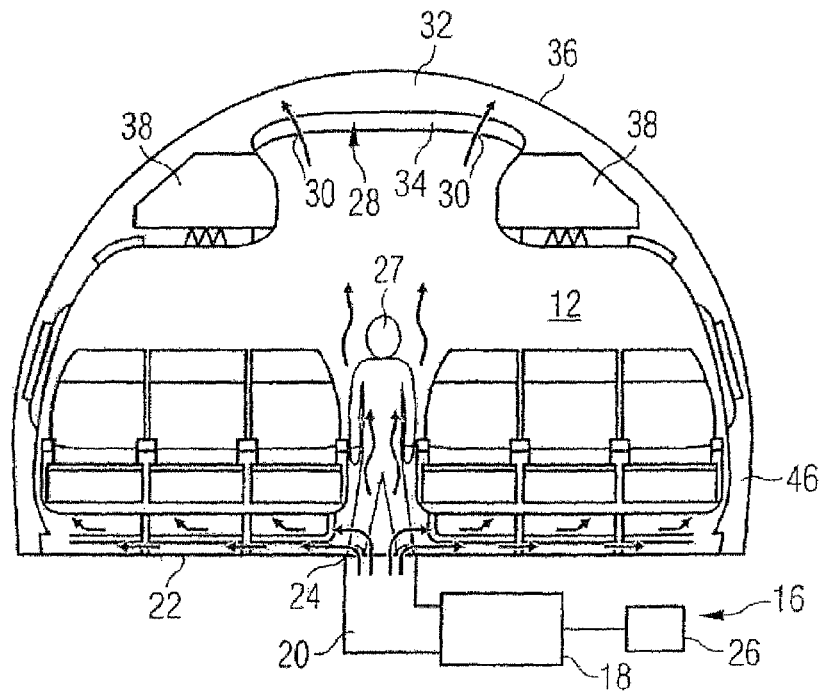
FIG. 2 shows a cross-section of an aircraft passenger cabin which is ventilated by means of a first embodiment of the aircraft air conditioning system according to the invention.

In contrast to this, FIG. 2 shows a cross-section of an aircraft passenger cabin 12 which is ventilated and pressurised by means of a first embodiment of an aircraft air conditioning system 16. The aircraft air conditioning system 16 comprises an air providing device 18 which is connected via a supply air duct 20 to a large number of air inlets 24 arranged in the region of a floor 22 of the passenger cabin 12. The air providing device 18 comprises a compressor, fed by engine bleed air, and a mixer connected downstream of the compressor. The fresh air provided by the compressor usually has a temperature corresponding to the lowest desired temperature of an aircraft region ventilated by the aircraft air conditioning system 16. The compressor fresh air can, as required, be mixed with recirculation air in the mixer. Furthermore, additional hot air can, if required, be admixed with the air downstream of the mixer.

The air providing device 18 is controlled by means of an electronic control unit 26. The electronic control unit 26 is set up to control the air providing device 18 and ensure that the air provided by the air providing device 18 has such a pressure and such an air pressure builds up in the supply air duct 20 that the air is blown into the passenger cabin 12, via the air inlets 24 having a constant flow cross-section, at such a speed that the air is uniformly distributed in the region of the floor 22 of the passenger cabin 12 and rises according to the principle of free convection at heat sources present in the passenger cabin 12. In other words, the electronic control unit 26 controls the air providing device 18 and the pressure in the supply air duct 20 in such a way that the air blown into the cabin 12 via the air inlets 24 forms in the cabin 12 the flow pattern illustrated in FIG. 2 (e.g., circulation according to the principle of displacement ventilation). In the figures, a person 27 is in each case schematically illustrated as an example of a heat source, and it will be understood that the person 27 is not shown to scale because a typical standing passenger will fill most of the floor 22 to ceiling 28 height of the cabin 12, which is generally less than 2.5 meters in height.

Since the air inlets 24 have a constant flow cross-section, the speed of the air blown into the passenger cabin 12 via the air inlets 24 is controlled by controlling the pressure in the supply air duct 20. The establishment of the desired flow pattern in the passenger cabin 12 is ensured when the air provided by the air providing device 18 is blown into the passenger cabin 12 via the inlets 24 at a speed of 0.1 to 0.5 m/s.

The air providing device 18 can only provide a limited air volume flow in energy-efficient operation. Consequently, the ambient temperature in the passenger cabin 12 can be controlled only to a limited extent by appropriate adaptation of the air volume flow supplied to the passenger cabin 12. The electronic control unit 26 is therefore further set up to control the air providing device 18 in such a way that the air provided by the air providing device 18 is blown into the passenger cabin 12 via the air inlets 24 at such a temperature that the desired ambient temperature is set in the passenger cabin 12. That is to say, the ambient temperature in the passenger cabin 12 is controlled by appropriate temperature control of the air provided by the air providing device 18.

The boundary surfaces of the passenger cabin 12 in the region of the floor 22 and the side walls are sufficiently airtight. The exhaust air can therefore be removed from the passenger cabin 12 via gap-shaped air outlets 30 arranged in the region of the ceiling 28 of the passenger cabin 12. Alternatively to this, the ceiling 28 of the passenger cabin 12 can also be designed to be partly or completely air-permeable. The air outlets 30 open into an exhaust air duct 32. As can be seen in particular in FIGS. 9 and 10, the exhaust air duct 32 extends along a longitudinal axis of the aircraft fuselage 10 in the region of the ceiling 28 of the passenger cabin 12 and is bounded by a panel 34, forming a ceiling covering of the passenger cabin 12, an aircraft fuselage upper shell 36 and luggage compartments 38 arranged in the passenger cabin 12. The exhaust air duct 32 leads exhaust air, exiting the passenger cabin 12 through the air outlets 30, in the direction of an air sink.

Figure 10:
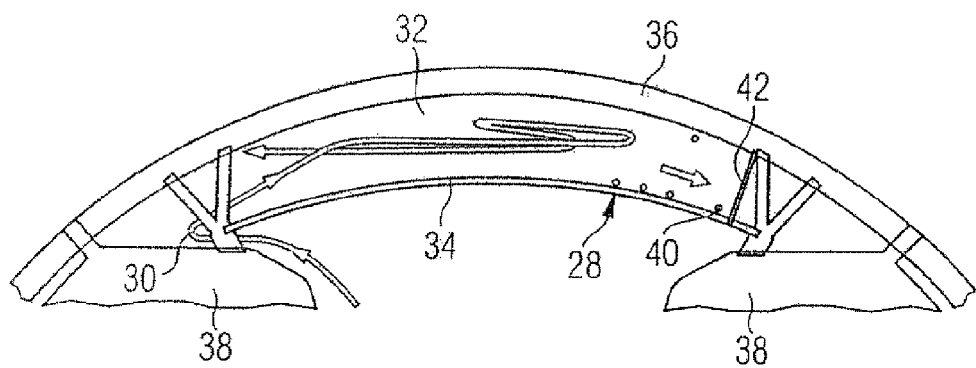
FIG. 10 shows a cross-sectional illustration of the exhaust air duct illustrated in FIG. 9.

Drops of condensation water 40 (see FIG. 10) may form in the exhaust air duct 32 on cold surfaces over which the exhaust air flows. In order to prevent condensation water from dripping from the exhaust air duct 32 into the passenger cabin 12, a condensation water protection device 42 designed in the form of a needle felt is arranged in the exhaust air duct 32. Furthermore, FIG. 10 illustrates that heat-generating components 44, such as, for example, lighting elements, are arranged in the exhaust air duct 32, over which components the exhaust air flows and which in the process release heat into the exhaust air. Finally, a recirculation duct 33, illustrated in FIG. 12, branches off from the exhaust air duct 32 and connects the exhaust air duct 32 to the mixer of the air providing device 18.

Figure 3:
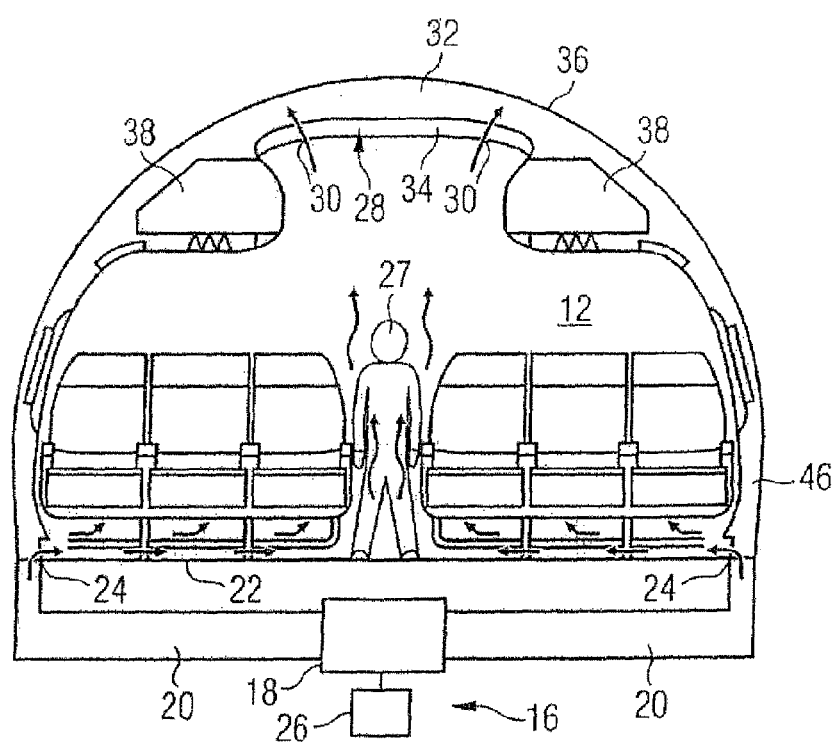
FIG. 3 shows a cross-section of an aircraft passenger cabin which is ventilated by means of a second embodiment of the aircraft air conditioning system according to the invention.

FIG. 3 shows a cross-sectional view of an aircraft passenger cabin 12 which is ventilated and pressurised by means of a second embodiment of the aircraft air conditioning system 16. The second embodiment of the aircraft air conditioning system 16 shown in FIG. 3 differs from the first embodiment illustrated in FIG. 2 in that the air inlets 24 are not arranged in the region of the floor 22 of the passenger cabin 12, but are formed in a region, near the floor, of a side wall 46 of the passenger cabin 12. The air inlets 24 are connected to the air providing device 18 by appropriately configured supply air ducts 20. In other respects, the design and mode of operation of the aircraft air conditioning system 16 shown in FIG. 3 correspond to the design and mode of operation of the arrangement according to FIG. 2.

Figure 4:
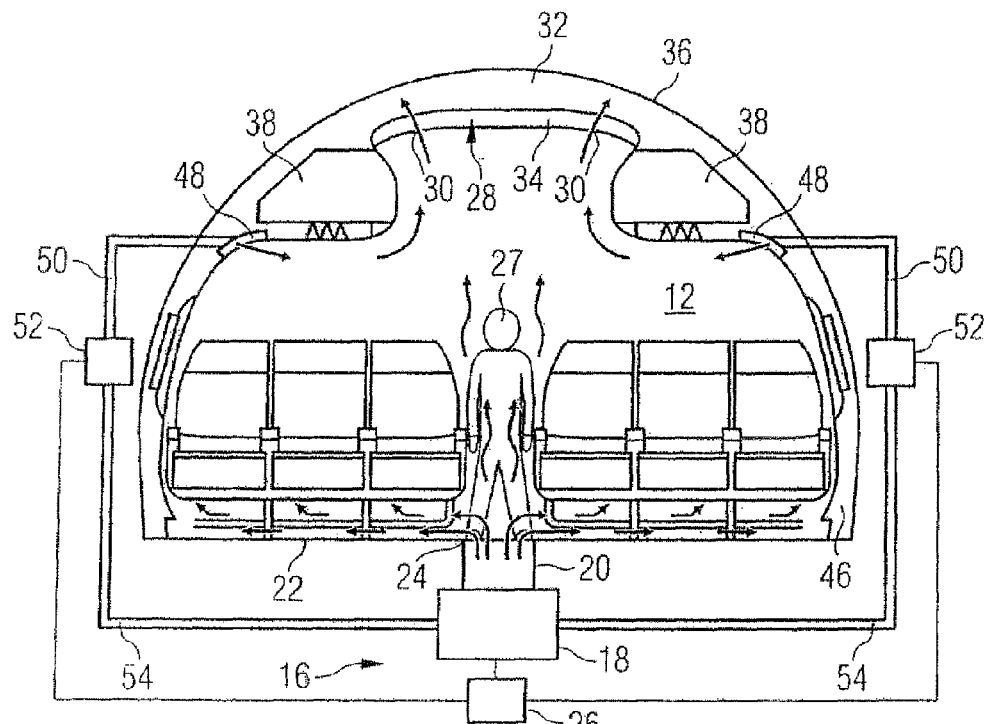
FIG. 4 shows a cross-section of an aircraft passenger cabin which is ventilated by means of a third embodiment of the aircraft air conditioning system according to the invention.

FIG. 4 shows a cross-sectional view of an aircraft passenger cabin 12 which is ventilated by means of a third embodiment of the aircraft air conditioning system 16. The third embodiment of the aircraft air conditioning system 16 shown in FIG. 4 differs from the first embodiment illustrated in FIG. 2 in that a plurality of auxiliary air inlets 48 are formed in the side walls 46 of the passenger cabin 12 below the luggage compartments 38. The auxiliary air inlets 48 are each connected to an auxiliary supply air duct 50. Each auxiliary supply air duct 50 is connected to an auxiliary air providing device 52 which, for its part, is connected to the air providing device 18 via a corresponding connecting duct 54. The auxiliary air providing device 52 comprises a pressure regulating device designed, for example, in the form of a valve, and a temperature regulating device. Consequently, the auxiliary air providing device is capable of providing auxiliary air which has a desired temperature and a desired pressure, it being possible for the temperature and the pressure of the auxiliary air provided by the auxiliary air providing device 52 to differ, if required, from the pressure and the temperature of the air provided by the air providing device 18.

The auxiliary air providing device 52 is, like the air providing device 18, controlled by means of the electronic control unit 26. In the operating case, illustrated in FIG. 4, of the aircraft air conditioning system 16, the electronic control unit 26 controls the auxiliary air providing device 52 and the pressure in the auxiliary supply air duct 50 in such a way that the auxiliary air provided by the auxiliary air providing device 52 is blown into the aircraft passenger cabin 12 via the auxiliary air inlets 48 at such a speed that the air is distributed in the cabin 12 in the region of a plane defined by the arrangement of the auxiliary air inlets 48 and rises at heat sources present in the passenger cabin 12. In order to ensure that the flow behaviour, shown in FIG. 4, of the auxiliary air blown into the cabin 12 via the auxiliary air inlets 48 arises, the speed of the auxiliary air when being blown into the passenger cabin 12 via the auxiliary air inlets 48 is at most 1 m/s.

Furthermore, the electronic control unit 26 controls the auxiliary air providing device 52 in such a way that the auxiliary air provided by the auxiliary air providing device 52 is blown into the cabin 12 via the auxiliary air inlets 48 at such a temperature that a desired ambient temperature is set in the cabin 12.

The electronic control unit 26 is further set up to control the auxiliary air providing device 52 and the pressure in the auxiliary supply air duct 50, if required, also in such a way that the auxiliary air provided by the auxiliary air providing device 52 is blown into the passenger cabin 12 via the auxiliary air inlets 48 at such a speed and with such an impulse that tumble air movements characteristic of mixing ventilation form in the passenger cabin 12 and free convection in the cabin 12 is substantially suppressed. Such an operating mode of the aircraft air conditioning system 16 is chosen when air conditioning of the cabin 12 as quickly as possible is desired or required in a particular situation.

Figure 5:
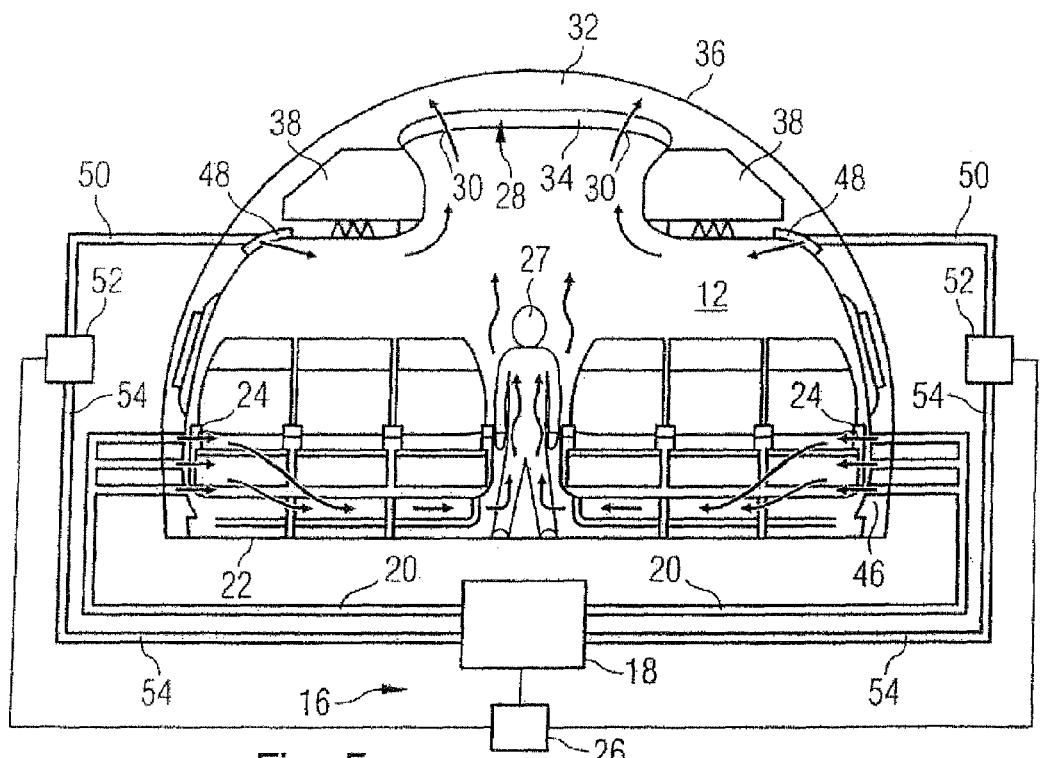
FIG. 5 shows a cross-section of an aircraft passenger cabin which is ventilated by means of a fourth embodiment of the aircraft air conditioning system according to the invention.
Figure 8:
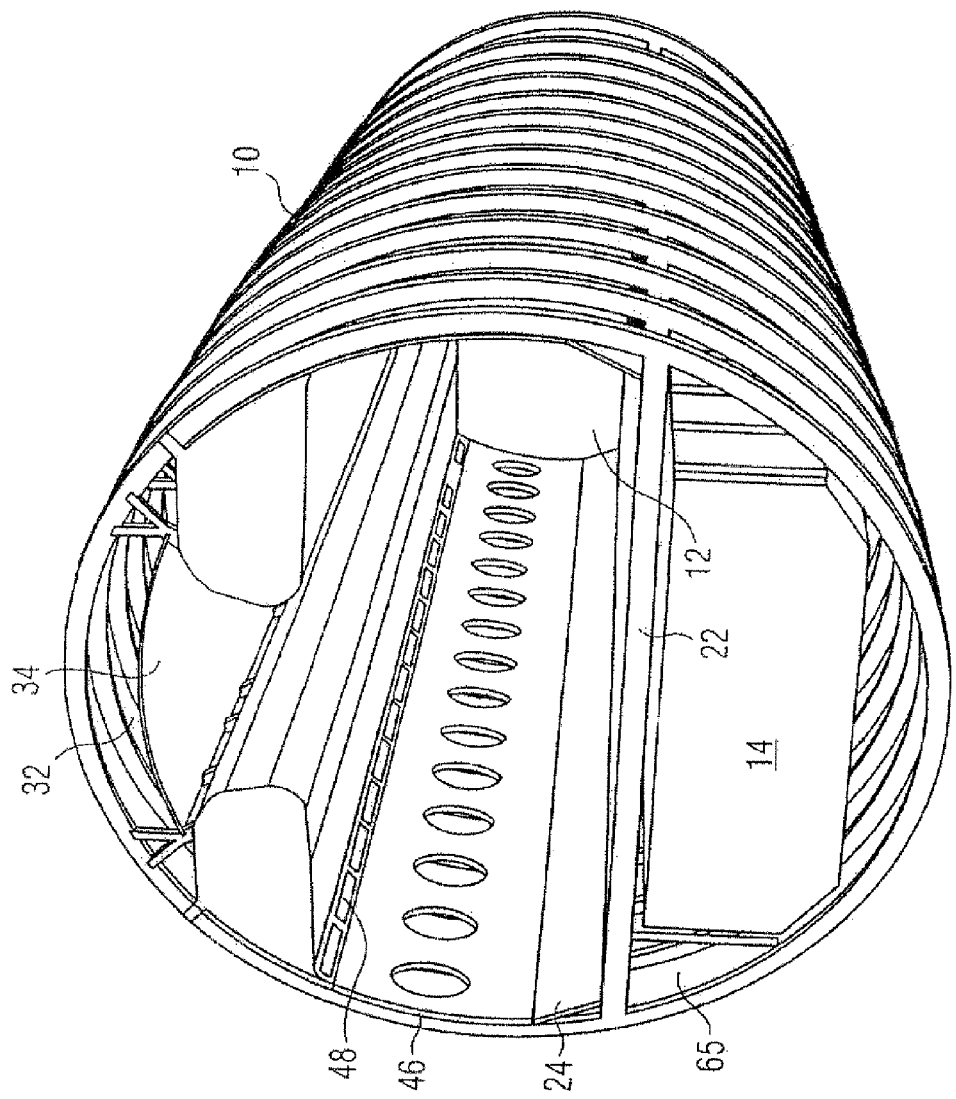
FIG. 8 shows a three-dimensional illustration of an aircraft fuselage section having an aircraft passenger cabin which is ventilated by means of the fourth embodiment of the aircraft air conditioning system according to the invention.

FIG. 5 shows a cross-sectional view of an aircraft passenger cabin 12 which is ventilated and pressurised by means of a fourth embodiment of the aircraft air conditioning system 16. A three-dimensional illustration of an aircraft fuselage section having a passenger cabin 12 ventilated and pressurised by means of the fourth embodiment of the aircraft air conditioning system 16 can be seen in FIG. 8. The fourth embodiment of the aircraft air conditioning system 16 shown in FIGS. 5 and 8 differs from the third embodiment according to FIG. 4 only in that the air inlets 24 are not arranged in the region of a floor 22 of the passenger cabin 12, but are formed near the floor in side walls 46 of the cabin 12. The air inlets 24 are each connected to the air providing device 18 by means of a corresponding supply air duct 20. In other respects, the design and mode of operation of the fourth embodiment of the aircraft air conditioning system 16 according to FIGS. 5 and 8 correspond to the design and mode of operation of the arrangement shown in FIG. 4.

Figure 6:
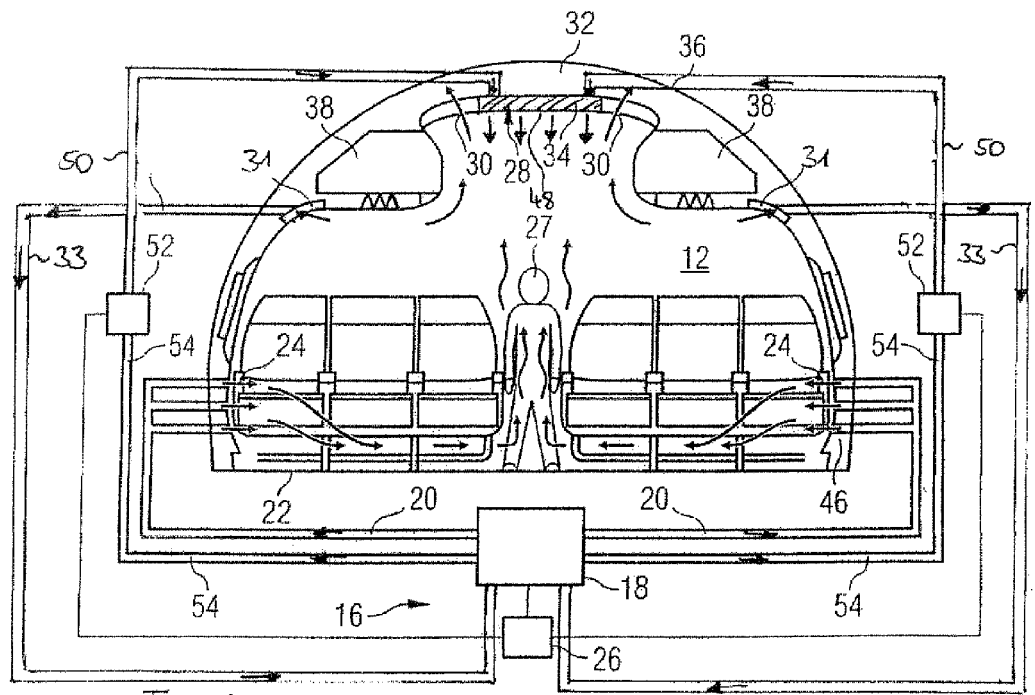
FIG. 6 shows a cross-section of an aircraft passenger cabin which is ventilated by means of a fifth embodiment of the aircraft air conditioning system according to the invention.

FIG. 6 shows a cross-sectional view of an aircraft passenger cabin 12 which is ventilated by means of a fifth embodiment of the aircraft air conditioning system 16. The fifth embodiment of the aircraft air conditioning system 16 shown in FIG. 6 differs from the fourth embodiment illustrated in FIG. 5 in that an auxiliary air inlet or a plurality of auxiliary air inlets 48 is or are formed in the region of the ceiling 28 of the passenger cabin 12. The auxiliary air inlets 48 are again each connected to an auxiliary supply air duct 50 and each auxiliary supply air duct 50 is connected to an auxiliary air providing device 52 which, for its part, is connected to the air providing device 18 via a corresponding connecting duct 54.

The auxiliary air providing device 52 is controlled by means of the electronic control unit 26. In the operating case, illustrated in FIG. 6, of the aircraft air conditioning system 16, the electronic control unit 26 controls the auxiliary air providing device 52 and the pressure in the auxiliary supply air duct 50 in such a way that the auxiliary air provided by the auxiliary air providing device 52 is blown into the aircraft passenger cabin 12 via the auxiliary air inlets 48 at a lower a speed than the air blown into the aircraft passenger cabin 12 via the air inlets 24. Furthermore, the electronic control unit 26 controls the auxiliary air providing device 52 in such a way that the auxiliary air provided by the auxiliary air providing device 52 is blown into the cabin 12 via the auxiliary air inlets 48 at a lower temperature than the air temperature in the cabin 12.

The aircraft air conditioning system 16 according to FIG. 6 further comprises recirculation outlets 31 arranged in the region of the side walls 46 of the cabin 12. The recirculation outlets 31 are each connected to a recirculation line 33 which, for its part, opens into a mixer of the air providing device 18. The air removed via the recirculation outlets 31 arranged in the region of the side walls 46 of the cabin 12 is usually cooler than air removed via the ceiling 28 of the cabin 12. The use of cooler air as recirculation air affords energy advantages which have an advantageous effect in the design of the air providing device 18.

Figure 7:
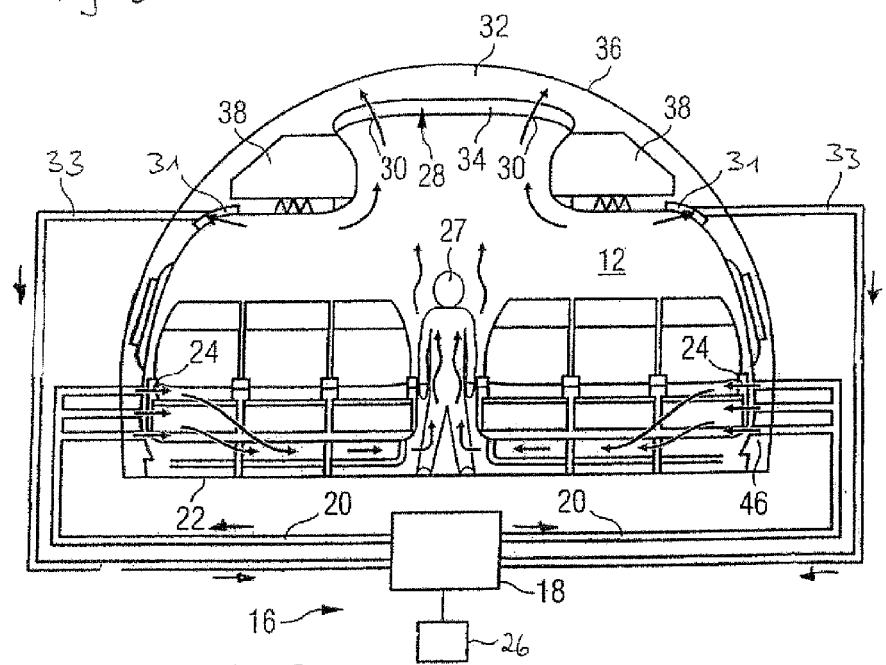
FIG. 7 shows a cross-section of an aircraft passenger cabin which is ventilated by means of a sixth embodiment of the aircraft air conditioning system according to the invention.

FIG. 7 shows, finally, a cross-sectional view of an aircraft passenger cabin 12 which is ventilated by means of a sixth embodiment of the aircraft air conditioning system 16. The sixth embodiment of the aircraft air conditioning system 16 shown in FIG. 7 differs from the fifth embodiment illustrated in FIG. 6 in that auxiliary air inlets 48 have been dispensed with, but recirculation outlets 31 arranged in the region of the side walls 46 of the cabin 12 serve to remove recirculation air from the cabin 12 and lead it via corresponding recirculation lines 33 into a mixer of the air providing device 18.

Figure 9:
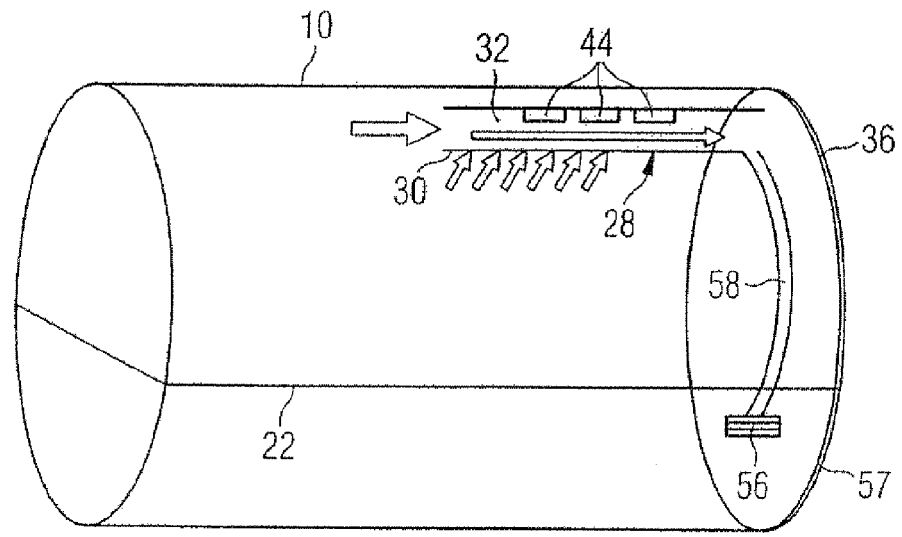
FIG. 9 shows a schematic illustration of an exhaust air duct of the aircraft air conditioning system according to the invention.
Figure 11:
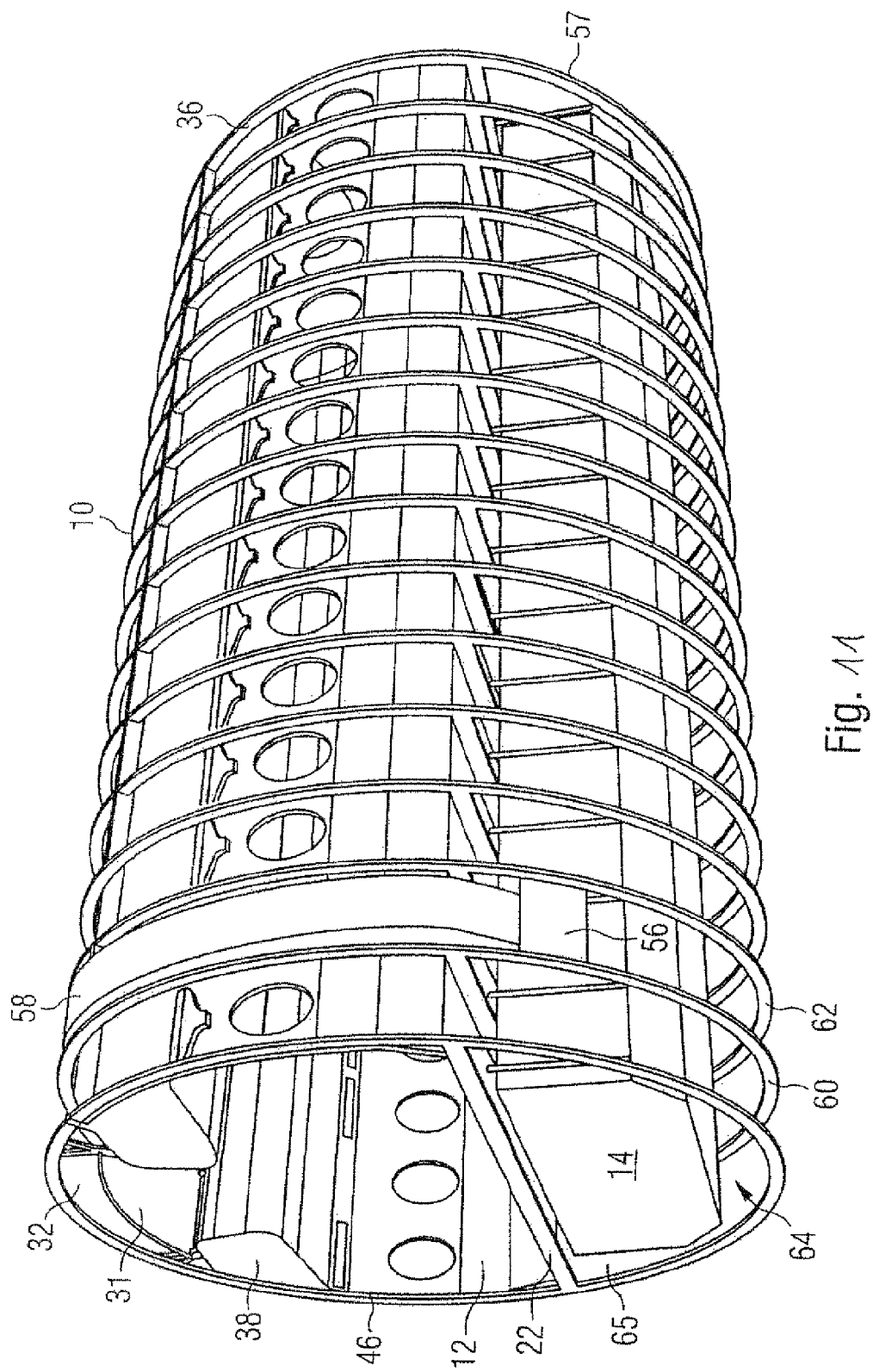
FIG. 11 shows a three-dimensional illustration of an aircraft fuselage section, illustrating the arrangement of a pressure regulating valve.
Figure 12:
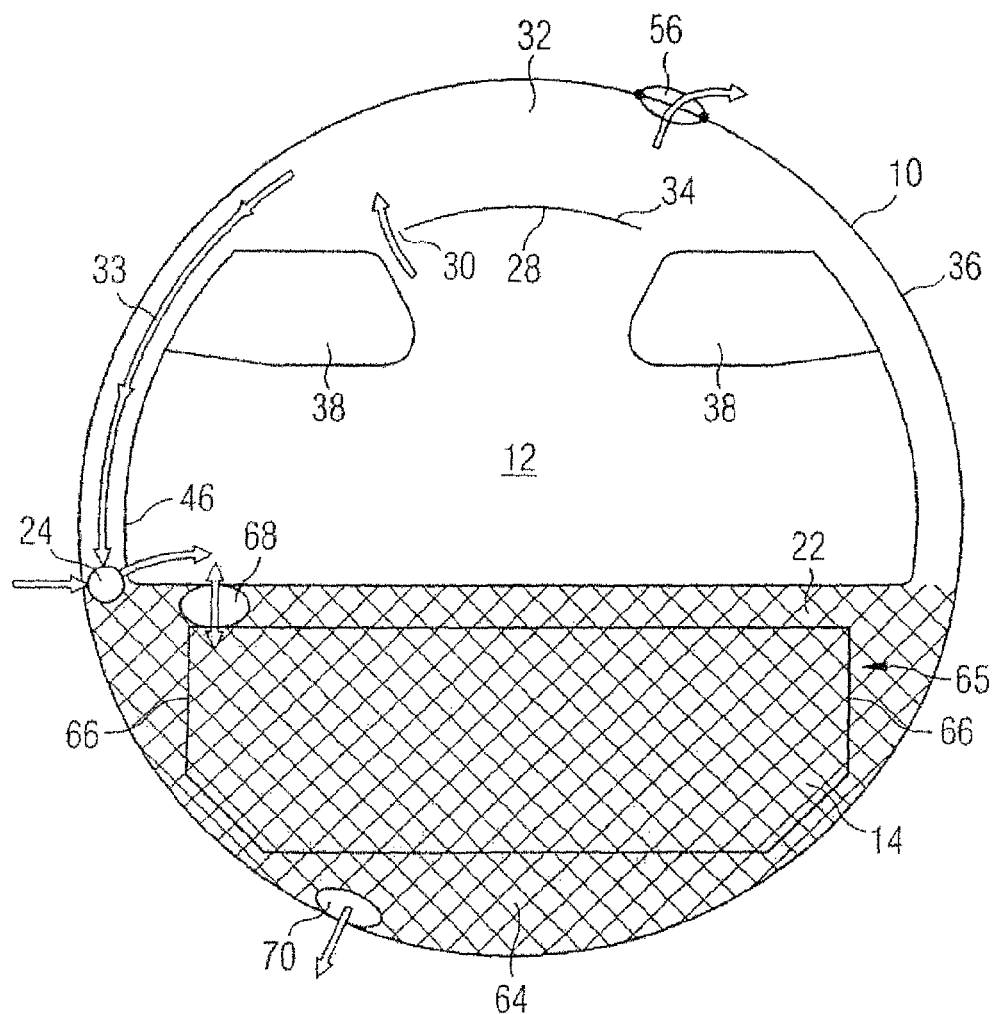
FIG. 12 shows a cross-section of an aircraft fuselage, illustrating, inter alia, the arrangement of a movable pressure equalising device and a cargo compartment outlet.

In the aircraft air conditioning system 16, the exhaust air is removed from the passenger cabin 12 through the air outlets 30 arranged in the region of the ceiling 28 of the cabin 12. A pressure regulating valve 56 for setting a desired pressure in a pressurised aircraft region can therefore be arranged in a side region of the aircraft fuselage 10, as shown in FIGS. 9, 11 and 12. In FIGS. 9 and 11, the pressure regulating valve 56 is arranged in a side region of an aircraft fuselage lower shell 57, and in FIG. 12 in a side region of the aircraft fuselage upper shell 36. Alternatively to this, it is also possible to position the pressure regulating valve 56 in a pressure bulkhead or integrate it in an existing exhaust air duct.

The pressure regulating valve 56 is connected to the air outlets 30 via a connecting duct 58 which branches off from the exhaust air duct 32. The connecting duct 58 extends along an aircraft skin between two frames 60, 62 arranged next to one another (see FIG. 11).

Since the pressure regulating valve 56 is positioned in a side region of the aircraft fuselage 10, a bottom region 64 of the aircraft fuselage lower shell 57 no longer has to be used as a stowage space for pipes connected to the pressure regulating valve 56. The bottom region 64 can therefore be used, for example, as an additional cargo compartment or for other purposes. Furthermore, an insulation of the aircraft fuselage lower shell 57 can also be dispensed with, since it is no longer necessary to protect pipes running in the bottom region 64 of the fuselage lower shell 57 from temperatures which are too low. A cross-sectional view of an aircraft fuselage 10 having a non-insulated fuselage lower shell 57 with a partly unventilated underfloor region 65 is illustrated in FIG. 12. The cargo compartment 14 arranged in the underfloor region 65 of the aircraft fuselage 10 is delimited in a weight-optimised manner by side boundary walls 66 consisting of a fireproof sheet.

In the arrangement shown in FIG. 12, there is no connection between the underfloor region 65, arranged in the non-insulated aircraft fuselage lower shell 57, and the passenger cabin 12. In order to enable a quick pressure equalisation between these two regions of the aircraft in the event of a sudden pressure drop in the underfloor region 65 or the cabin 12, a pressure equalising device 68 is provided. The pressure equalising device 68 is designed in the form of a flap which is placed in the floor 22 separating the underfloor region 65 from the passenger cabin 12. If a pressure difference between the cabin 12 and the underfloor region 65 of the aircraft fuselage 10 exceeds a predetermined value, the flap forming the pressure equalising device 68 is automatically opened, enabling a pressure equalisation between the cabin 12 and the underfloor region 65 of the aircraft fuselage 10. Damage of the fuselage structure caused by a differential pressure between the passenger cabin 12 and the underfloor region 65 is thereby avoided.

Since, as already mentioned, there is no connection between the passenger cabin 12 and the aircraft fuselage lower shell, gases or odours arising in the cargo compartment 14 are also prevented from passing into the passenger cabin 12 in the arrangement shown in FIG. 12. In order to ensure particularly good venting of the cargo compartment 14, the cargo compartment 14 is connected to the outside atmosphere via a venting device 70 arranged in the aircraft fuselage lower shell and designed in the form of a flap.

Figure 13:
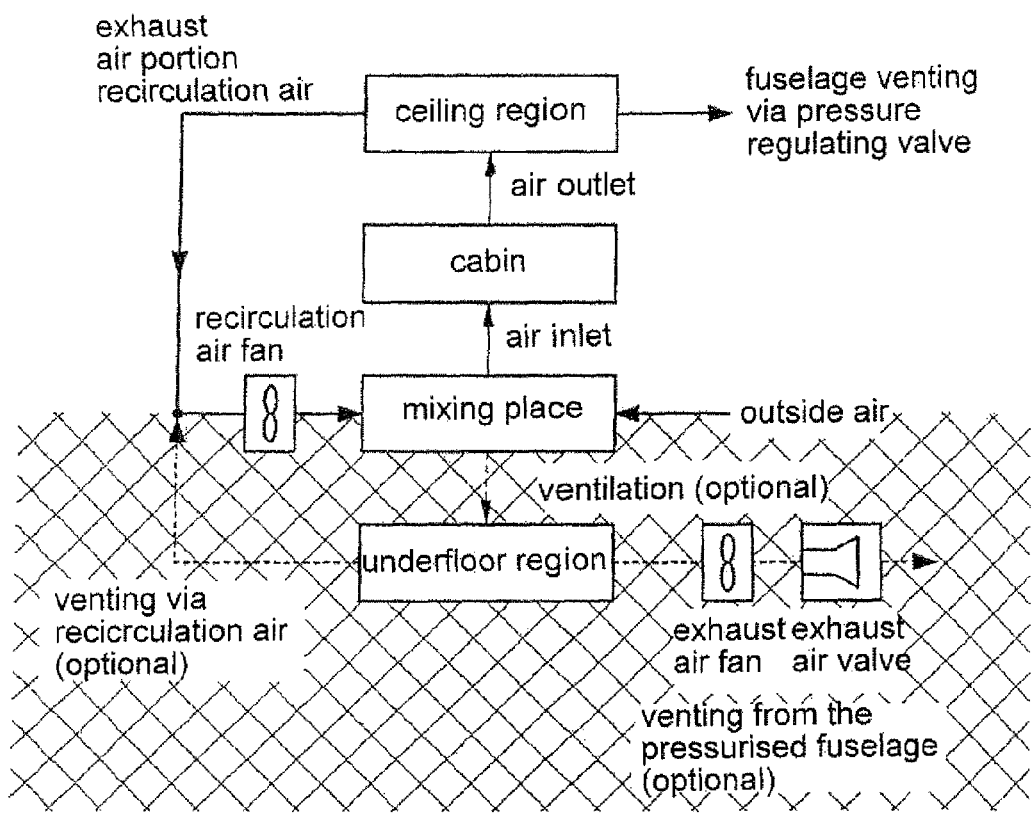
FIG. 13 shows a schematic diagram of the basic design and the mode of operation of an aircraft air conditioning system according to the invention.

The basic design and the mode of operation of an aircraft air conditioning system described above are illustrated in the schematic illustration of FIG. 13. In a mixing place or a mixer of the air providing device, outside air is mixed with recirculation air. The air is led from the mixing place via the air inlet into the passenger cabin, where the above-described flow pattern forms. The exhaust air is removed from the cabin via the air outlet formed in the ceiling region of the cabin. To regulate the pressure in the cabin, the exhaust air removed from the cabin via the air outlet is, if required, removed to the outside atmosphere via the pressure regulating valve. Some of the exhaust air is led back into the mixing place of the air providing device as recirculation air, the recirculation air being conveyed through the recirculation line by means of a recirculation air fan.

An underfloor region of the aircraft can be completely or partly unventilated or, like the passenger cabin, ventilated by means of the aircraft air conditioning system. To ventilate the underfloor region, air is led into the underfloor region from the mixing place of the air providing device. The exhaust air can be removed from the underfloor region of the aircraft by a line connecting the underfloor region to the recirculation line or to the mixing place of the air providing device. In this case, the exhaust air is led back from the underfloor region into the mixing place of the air providing device as recirculation air. Alternatively or additionally to this, however, it is also possible to remove the exhaust air from the underfloor region through an appropriate exhaust air valve. The exhaust air is conveyed in the direction of the exhaust air valve by means of an exhaust air fan.

The invention claimed is:
1. An aircraft, comprising:
a system for air conditioning at least one partial region of the aircraft, the system comprising:
an air providing device for providing cooled air to be supplied to a region of the aircraft to be ventilated at a desired temperature and pressure;
a supply air duct which is connected at a first end to the air providing device;
an air inlet which is connected to a second end of the supply air duct and opens near a floor of the aircraft into the aircraft region to be ventilated;
a control device which is set up to ensure at least in selected operational situations of the air conditioning system that the cooled air provided by the air providing device enters the aircraft region to be ventilated via the air inlet at a speed of 0.1 to 0.5 meters/second such that the cooled air is distributed in the aircraft region to be ventilated over the entire floor area and forms a climatization air layer near the floor and then rises at heat sources present in the aircraft region to be ventilated due to free convection, thereby ventilating the aircraft region to be ventilated by the principle of displacement ventilation, wherein the control device further is adapted such that the cooled air provided by the air providing device enters the aircraft region to be ventilated via the air inlet at such a temperature that the desired temperature is achieved in the aircraft region to be ventilated;
an air outlet for removing exhaust air from the aircraft region to be ventilated, the air outlet arranged in the region of a ceiling of the aircraft region to be ventilated; and
a pressure regulating valve for setting a desired pressure in the aircraft region to be ventilated, the pressure regulating valve connecting the pressurized aircraft region to be ventilated to the outside atmosphere via the air outlet, and the pressure regulating valve arranged in a side region of an aircraft fuselage upper shell or an aircraft fuselage lower shell.

2. The aircraft according to claim 1, wherein the air inlet is arranged in at least one region of the floor, a region near the floor, and a region of a side wall of the aircraft region to be ventilated.

3. The aircraft according to claim 1, further comprising:
a device for providing auxiliary cooled air to be supplied to the region of the aircraft to be ventilated at the desired temperature and pressure;
an auxiliary supply air duct which is connected at a first end to the auxiliary air providing device; and
an auxiliary air inlet which is connected to a second end of the auxiliary supply air duct and opens into the aircraft region to be ventilated.

4. The aircraft according to claim 3, wherein the auxiliary air inlet is arranged in at least one of the region of a side wall and in the region of the ceiling of the aircraft region to be ventilated.

5. The aircraft according to claim 3, further comprising:
an auxiliary control device which is set up to ensure that the auxiliary cooled air provided by the auxiliary air providing device enters the aircraft region to be ventilated, via the auxiliary air inlet which is arranged in the region of a side wall of the aircraft region to be ventilated, at such a speed that the auxiliary cooled air is distributed in the aircraft region to be ventilated in the region of the aircraft defined by the arrangement of the auxiliary air inlet and then rises at heat sources present in the aircraft region to be ventilated, thereby ventilating the aircraft region to be ventilated by the principle of displacement ventilation, and that the auxiliary cooled air provided by the auxiliary air providing device enters the aircraft region to be ventilated, via the auxiliary air inlet arranged in the region of a side wall of the aircraft region to be ventilated, at such a temperature that the desired temperature is achieved in the aircraft region to be ventilated.

6. The aircraft according to claim 5, wherein the auxiliary control device is operable to ensure that the auxiliary air provided by the auxiliary air providing device enters the aircraft region to be ventilated, via the auxiliary air inlet, at such a speed that tumble air movements characteristic of mixing ventilation form in the aircraft region to be ventilated.

7. The aircraft according to claim 3, further comprising:
an auxiliary control device which is set up to ensure that the auxiliary cooled air provided by the auxiliary air providing device enters the aircraft region to be ventilated, via the auxiliary air inlet which is arranged in the region of the ceiling of the aircraft region to be ventilated, at a lower speed than the cooled air entering the aircraft region to be ventilated via the air inlet.

8. The aircraft according to claim 7, wherein the auxiliary control device is operable to control the speed of the auxiliary air such that the auxiliary air entering the aircraft region to be ventilated, via the auxiliary air inlet, is effective for cooling and ventilating substantially only in the region of the ceiling and an aisle of the aircraft region to be ventilated.

9. The aircraft system according to claim 1, wherein the air outlet is connected via a connecting duct to the pressure regulating valve.

10. The aircraft according to claim 9, further comprising:
an exhaust air duct which is connected to the air outlet, extends at least in sections along the ceiling region of the aircraft region to be ventilated and leads exhaust air away from the aircraft region to be ventilated.

11. The aircraft according to claim 10, wherein at least one of: a condensation water protection device is arranged in the exhaust air duct; and the exhaust air duct is configured and arranged in such a way that exhaust air flowing through the exhaust air duct is brought into thermal contact with heat-generating components installed in the ceiling region of the aircraft region to be ventilated, in order to remove heat from the heat-generating components.

12. The aircraft according to claim 1, further comprising:
a recirculation duct, connected to at least one of the air outlet and to a recirculation outlet formed separately from the air outlet, for returning to the air providing device exhaust air removed from the aircraft region to be ventilated through the air outlet.

13. The aircraft according to claim 1, wherein the speed of the cooled air entering the aircraft region to be ventilated is controlled by the control device to prevent tumble air movements that would mix the cooled air generally throughout an entirety of the aircraft region to be ventilated.

14. The aircraft according to claim 1, wherein the aircraft region to be ventilated is a region in a passenger cabin of the aircraft defining a maximum height of less than 2.5 meters.

15. A method for air conditioning an aircraft with an air conditioning system, the method comprising:
providing cooled air, to be supplied to a region of the aircraft to be ventilated at a desired temperature and pressure, by an air providing device;
leading the cooled air from the air providing device through a supply air duct to an air inlet which opens near a floor of the aircraft into the aircraft region to be ventilated, and
ensuring, by a control device at least in selected operational situations of the air conditioning system, that the cooled air provided by the air providing device enters the aircraft region to be ventilated via the air inlet at a speed of 0.1 to 0.5 meters/second such that the air is distributed in the aircraft region to be ventilated over the entire floor area and forms a climatization air layer near the floor and then rises at heat sources present in the aircraft region to be ventilated due to free convection, thereby ventilating the aircraft region to be ventilated by the principle of displacement ventilation, wherein the control device further ensures that the cooled air provided by the air providing device enters the aircraft region to be ventilated via the air inlet at such a temperature that the desired temperature is achieved in the aircraft region to be ventilated,
wherein exhaust air from the aircraft region to be ventilated is removed from the aircraft region to be ventilated through an air outlet arranged in the region of a ceiling of the aircraft region to be ventilated,
wherein a pressure regulating valve arranged in a side region of an aircraft fuselage upper shell or in a side region of an aircraft fuselage lower shell connects the pressurized aircraft region to be ventilated to the outside atmosphere via the air outlet, and the exhaust air from the aircraft region to be ventilated, if required, for setting a desired pressure in the aircraft region to be ventilated, is removed to the outside atmosphere via the pressure regulating valve.

16. The method according to claim 15, wherein the cooled air is blown into the aircraft region to be ventilated through the air inlet which is arranged in at least one region of the floor, a region near the floor, or a region of a side wall of the aircraft region to be ventilated.

17. The method according to claim 15, further comprising:
providing auxiliary cooled air, to be supplied to the region of the aircraft to be ventilated at the desired temperature and pressure, by an auxiliary air providing device; and leading the auxiliary cooled air from the auxiliary air providing device through an auxiliary supply air duct to an auxiliary air inlet which opens into the aircraft region to be ventilated.

18. The method according to claim 17, wherein the auxiliary cooled air is blown into the aircraft region to be ventilated via the auxiliary air inlet arranged in at least one region of a side wall or region of the ceiling of the aircraft region to be ventilated.

19. The method according to claim 17, wherein an auxiliary control device ensures that the auxiliary cooled air provided by the auxiliary air providing device enters the aircraft region to be ventilated, via the auxiliary air inlet which is arranged in the region of a side wall of the aircraft region to be ventilated, at such a speed that the auxiliary cooled air is distributed in the aircraft region to be ventilated in the region of the aircraft defined by the arrangement of the auxiliary air inlet and then rises at heat sources present in the aircraft region to be ventilated, thereby ventilating the aircraft region to be ventilated by the principle of displacement ventilation, and that the auxiliary cooled air provided by the auxiliary air providing device enters the aircraft region to be ventilated, via the auxiliary air inlet arranged in the region of the side wall of the aircraft region to be ventilated, at such a temperature that the desired temperature is achieved in the aircraft region to be ventilated.

20. The method according to claim 19, wherein the auxiliary control device operates to ensure that the auxiliary air provided by the auxiliary air providing device enters the aircraft region to be ventilated, via the auxiliary air inlet, at such a speed that tumble air movements characteristic of mixing ventilation form in the aircraft region to be ventilated.

21. The method according to claim 17, wherein an auxiliary control device ensures that the auxiliary cooled air provided by the auxiliary air providing device enters the aircraft region to be ventilated, via the auxiliary air inlet which is arranged in the region of the ceiling of the aircraft region to be ventilated, at a lower speed than the cooled air entering the aircraft region to be ventilated via the air inlet.

22. The method according to claim 21, wherein the auxiliary control device operates to control the speed of the auxiliary air such that the auxiliary air entering the aircraft region to be ventilated, via the auxiliary air inlet, is effective for cooling and ventilating substantially only in the region of the ceiling and an aisle of the aircraft region to be ventilated.

23. The method according to claim 15, wherein the air outlet is connected via a connecting duct to the pressure regulating valve.

24. The method according to claim 23, wherein the exhaust air from the aircraft region to be ventilated is led through an exhaust air duct, which is connected to the air outlet and extends at least in sections along the ceiling region of the aircraft region to be ventilated.

25. The method according to claim 24, wherein at least one of a condensation water in the exhaust air duct is caught by means of a condensation water protection device or that exhaust air flowing through the exhaust air duct is brought into thermal contact with heat-generating components installed in the ceiling region of the aircraft region to be ventilated, in order to remove heat from the heat-generating components.

26. The method according to claim 15, wherein at least one of an exhaust air is removed from the aircraft region to be ventilated through the air outlet or a recirculation outlet formed separately from the air outlet is returned to the air providing device via a recirculation duct connected to at least one of the air outlet or the recirculation outlet.

27. The method according to claim 15, wherein the speed of the cooled air entering the aircraft region to be ventilated is controlled by the control device to prevent tumble air movements that would mix the cooled air generally throughout an entirety of the aircraft region to be ventilated.

28. The method according to claim 15, wherein the aircraft region to be ventilated is a region in a passenger cabin of the aircraft defining a maximum height of less than 2.5 meters.

* * * * *